United States Patent
Sasaki et al.

(10) Patent No.: US 8,532,979 B2
(45) Date of Patent: Sep. 10, 2013

(54) INFORMATION PROCESSING APPARATUS, INFORMATION PROCESSING METHOD, AND PROGRAM FOR PRESENTING DATA BASED UPON A DETECTION OF A PHOTOGRAPHIC SUBJECT

(75) Inventors: Natsuko Sasaki, Tokyo (JP); Satoshi Ozaki, Tokyo (JP); Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 12/869,111

(22) Filed: Aug. 26, 2010

(65) Prior Publication Data

US 2011/0099002 A1  Apr. 28, 2011

(30) Foreign Application Priority Data

Oct. 28, 2009  (JP) .................................. 2009-247759

(51) Int. Cl.
*G06F 17/27*  (2006.01)
*G06F 17/20*  (2006.01)
*G06Q 30/00*  (2012.01)

(52) U.S. Cl.
USPC .................................. 704/9; 704/1; 705/26.7

(58) Field of Classification Search
USPC .................................. 704/1, 9; 705/26.1, 26.7
See application file for complete search history.

(56) References Cited

U.S. PATENT DOCUMENTS

| | | | |
|---|---|---|---|
| 6,260,064 B1 * | 7/2001 | Kurzrok | ........................ 709/224 |
| 7,519,562 B1 * | 4/2009 | Vander Mey et al. | .......... 705/500 |
| 7,620,651 B2 * | 11/2009 | Chea et al. | ..................... 707/750 |
| 2005/0198661 A1 | 9/2005 | Collins et al. | |
| 2006/0247983 A1 * | 11/2006 | Dalli | .............................. 705/27 |
| 2007/0078670 A1 | 4/2007 | Dave et al. | |
| 2008/0004950 A1 | 1/2008 | Huang et al. | |
| 2008/0133488 A1 * | 6/2008 | Bandaru et al. | ................... 707/3 |
| 2008/0256040 A1 * | 10/2008 | Sundaresan et al. | .............. 707/3 |
| 2009/0024621 A1 | 1/2009 | Burgess et al. | |

FOREIGN PATENT DOCUMENTS

| | | |
|---|---|---|
| EP | 1 557 810 A2 | 7/2005 |
| JP | 2009-510637 | 3/2009 |
| WO | WO 2007/041545 A2 | 4/2007 |

OTHER PUBLICATIONS

Extended Search Report issued Jan. 26, 2011, in European Patent Application No. 10188412.0-1228.

* cited by examiner

*Primary Examiner* — Jesse Pullias
(74) *Attorney, Agent, or Firm* — Oblon, Spivak, McClelland, Maier & Neustadt, L.L.P.

(57) ABSTRACT

An information processing apparatus includes a holding unit configured to hold, in advance, presentation data to be presented to a person; a detection unit configured to detect, in a captured image obtained by capturing an image of a photographic subject, the photographic subject; a reading unit configured to read presentation data associated with a detection result of the photographic subject from among items of presentation data held in advance; and an output unit configured to output the read presentation data.

20 Claims, 15 Drawing Sheets

INFORMATION PROCESSING APPARATUS, INFORMATION PROCESSING METHOD, AND PROGRAM FOR PRESENTING DATA BASED UPON A DETECTION OF A PHOTOGRAPHIC SUBJECT

BACKGROUND OF THE INVENTION

1. Field of the Invention

The present invention relates to an information processing apparatus, an information processing method, and a program, and more particularly, to an information processing apparatus, an information processing method, and a program suitable to be used when controlling display in accordance with a photographic subject detected in a captured image obtained by capturing an image of the photographic subject.

2. Description of the Related Art

At present, there are sites at which articles such as books and household electric appliances can be purchased. At these sites, besides descriptions describing the appearances and performances of the articles, comments on the articles written by users who have purchased the articles are often provided, together with the users' evaluations of the purchased articles.

Together with the users' evaluations, these comments serve as one type of useful information for purchasing these articles. However, when numerous comments on an article are provided, it is necessary for a user who wishes to purchase the article to read these numerous comments, which is a very bothersome work.

There is a selection technique (e.g., see Japanese Unexamined Patent Application Publication No. 2009-510637) of selecting, from among comments existing on sites on the Internet, comments that satisfy a certain criterion (e.g., a criterion that selects comments with relatively recent dates) and displaying the selected comments on a site.

With this selection technique, only comments that satisfy a certain criterion are selected from among a plurality of comments, and the selected comments are displayed. Therefore, it is only necessary for a user to refer to the comments selected from among the plurality of comments. Thus, the user feels less bothersome when reading the comments.

Also, when a user wishes to purchase an article at a store, it is difficult for the user to read comments existing on sites on the Internet in order to obtain useful information for purchasing the article. Therefore, it is conceivable that a display is located at the store, and comments selected using the above selection technique are displayed on the located display as advertisements prompting the user to purchase a certain article.

SUMMARY OF THE INVENTION

However, when comments selected using the above selection technique are displayed as advertisements prompting a user to purchase an article, the same comments satisfying a certain criterion are uniformly displayed, regardless of the age or sex of a customer (person) who sees the advertisements displayed on a display. For some customers, these comments may not necessarily function as advertisements prompting the customers to purchase an article.

In view of these circumstances, the present invention provides a technique that makes it possible to provide appropriate information in accordance with the age or sex of a person.

An information processing apparatus according to an embodiment of the present invention includes the following elements: holding means for holding, in advance, presentation data to be presented to a person; detection means for detecting, in a captured image obtained by capturing an image of a photographic subject, the photographic subject; reading means for reading presentation data associated with a detection result of the photographic subject from among items of presentation data held in advance; and output means for outputting the read presentation data.

The holding means may hold, for each person, presentation data determined in advance in accordance with an attribute of the person, in association with each other. The reading means may read, in response to detection of a person as the photographic subject, presentation data associated with the detected person from among the items of presentation data held in advance.

The presentation data may be a review sentence of a target to be recommended to a person, and the output means may output the review sentence to a display unit and causes the review sentence to be displayed.

The output means may emphasize a certain word among words constituting the review sentence and may cause the review sentence including the emphasized certain word to be displayed.

The information processing apparatus may further include calculation means for calculating, for each of a plurality of candidate review sentences representing candidates for the review sentence, an appropriateness score representing the degree of how the candidate review sentence is appropriate as the review sentence; and extraction means for extracting, from among the plurality of candidate review sentences, a review sentence whose appropriateness score is greater than or equal to a certain appropriateness threshold. The holding means may hold the extracted review sentence as display data.

The information processing apparatus may further include computing means for computing a word score for each of words constituting each of the plurality of candidate review sentences. The calculation means may calculate, as the appropriateness score, an average of word scores computed for each of the plurality of candidate review sentences.

The output means may emphasize, among words constituting the review sentence, a word whose word score is greater than or equal to a certain score threshold and may cause the review sentence including the emphasized word to be displayed.

The computing means may compute the word score of a word based on the degree of frequency of the word appearing in the plurality of candidate review sentences.

The holding means may further hold, for each of combinations of a plurality of persons, presentation data determined in advance in accordance with attributes of the plurality of persons, in association with each other. The reading means may read, in response to detection of a plurality of persons as the photographic subject, presentation data associated with a combination of the detected plurality of persons.

The information processing apparatus may further include determination means for determining whether the person detected as the photographic subject is gazing at the display unit for a certain time or longer. The output means may cause a review sentence that is more detailed than the review sentence being displayed on the display unit to be displayed, when the determination means determines that the person is gazing at the display unit for the certain time or longer.

The holding means may hold, for each of articles to be recommended to a person, presentation data determined in advance in accordance with the article. The reading means may read, in response to detection of an article as the photographic subject, presentation data associated with the detected article from among items of presentation data held in advance.

The presentation data may be detailed data representing details of an article, and the output means may output the detailed data to the display unit and causes the detailed data to be displayed.

The information processing apparatus may further include second holding means for holding, for each of the articles, related detailed data representing details of a related article that is related to the article. The reading means may further read, in response to detection of an article as the photographic subject, related detailed data associated with the article from among items of related detailed data held in advance. The output means may output the detailed data and the related detailed data to the display unit and causes the detailed data and the related detailed data to be displayed.

The reading means may read, in response to detection of a person as the photographic subject, presentation data based on a purchase history representing a history of the person purchasing articles.

The attribute of the person may include at least one of the acre, race, facial expression, and sex of the person.

An information processing method according to an embodiment of the present invention is an information processing method for an information processing apparatus including holding means, detection means, reading means, and outputting means. The method includes the steps of: holding, by the holding means, in advance, presentation data to be presented to a person; detecting, by the detection means, in a captured image obtained by capturing an image of a photographic subject, the photographic subject; reading, by the reading means, presentation data associated with a detection result of the photographic subject from among items of presentation data held in advance; and outputting, by the output means, the read presentation data.

A program according to an embodiment of the present invention is a program for causing a computer to function as: holding means for holding, in advance, presentation data to be presented to a person; detection means for detecting, in a captured image obtained by capturing an image of a photographic subject, the photographic subject; reading means for reading presentation data associated with a detection result of the photographic subject from among items of presentation data held in advance; and output means for outputting the read presentation data.

According to an embodiment of the present invention, a photographic subject is detected in a captured image obtained by capturing an image of the photographic subject. From among items of presentation data held in advance, presentation data associated with a detection result of the photographic subject is read. The read presentation data is output.

According to an embodiment of the present invention, appropriate information can be provided in accordance with the age or sex of a person.

DESCRIPTION OF THE PREFERRED EMBODIMENTS

Hereinafter, an embodiment for embodying the present invention (hereinafter called an "embodiment") will be described. The description will be given in the following older:

1. Embodiment (examples when display of a display screen is changed in accordance with a photographic subject detected in a captured image)

2. Modifications

1. Embodiment

Example of Configuration of Display System 1

Figure 1:
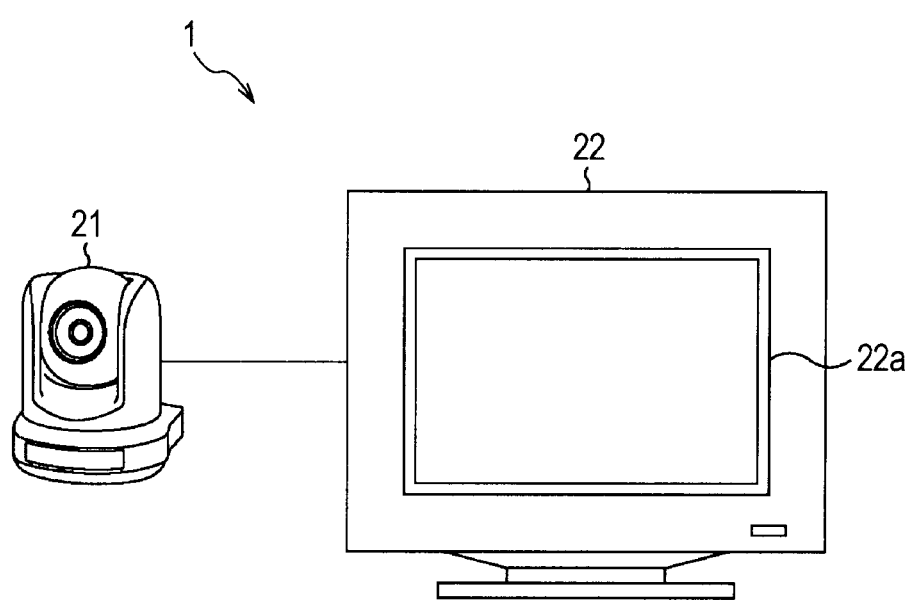
FIG. 1 is a diagram illustrating an example of the configuration of a display system according to an embodiment of the present invention.

FIG. 1 illustrates an example of the configuration of a display system 1 according to an embodiment of the present invention.

The display system 1 includes a camera 21 and a display device 22. For example, the display system 1 is placed at a book shelf located in a book store.

The camera 21 captures an image of a photographic subject while being placed at, for example, the book shelf located in the book store at which the camera 21 can capture an image of an aisle side adjacent to the book shelf, and the camera 21 provides a captured image obtained as a result of the image capturing to the display device 22.

That is, for example, the camera 21 captures an image of a person passing through the aisle adjacent to the book shelf, the front (or back) face of a book taken by the person in the aisle, or the like, and provides a captured image obtained as a result of the image capturing to the display device 22.

The display device 22 tries to detect a person or the front face of a book in the captured image provided by the camera 21. In accordance with the detection result, the display device 22 displays, on a display screen 22a of the display device 22, information such as a ranking indicating the order of popular books, book information representing the details of a recommended book (such as the title, publisher, author, and front face of the book), and a point of purchase advertising (hereinafter abbreviated as "POP") sentence prompting a customer to purchase the recommended book.

Display Example of Display Screen 22a

Referring now to FIGS. 2 to 6, a display example where the display device 22 displays information on the display screen 22a in accordance with a detection result will be described.

Figure 2:
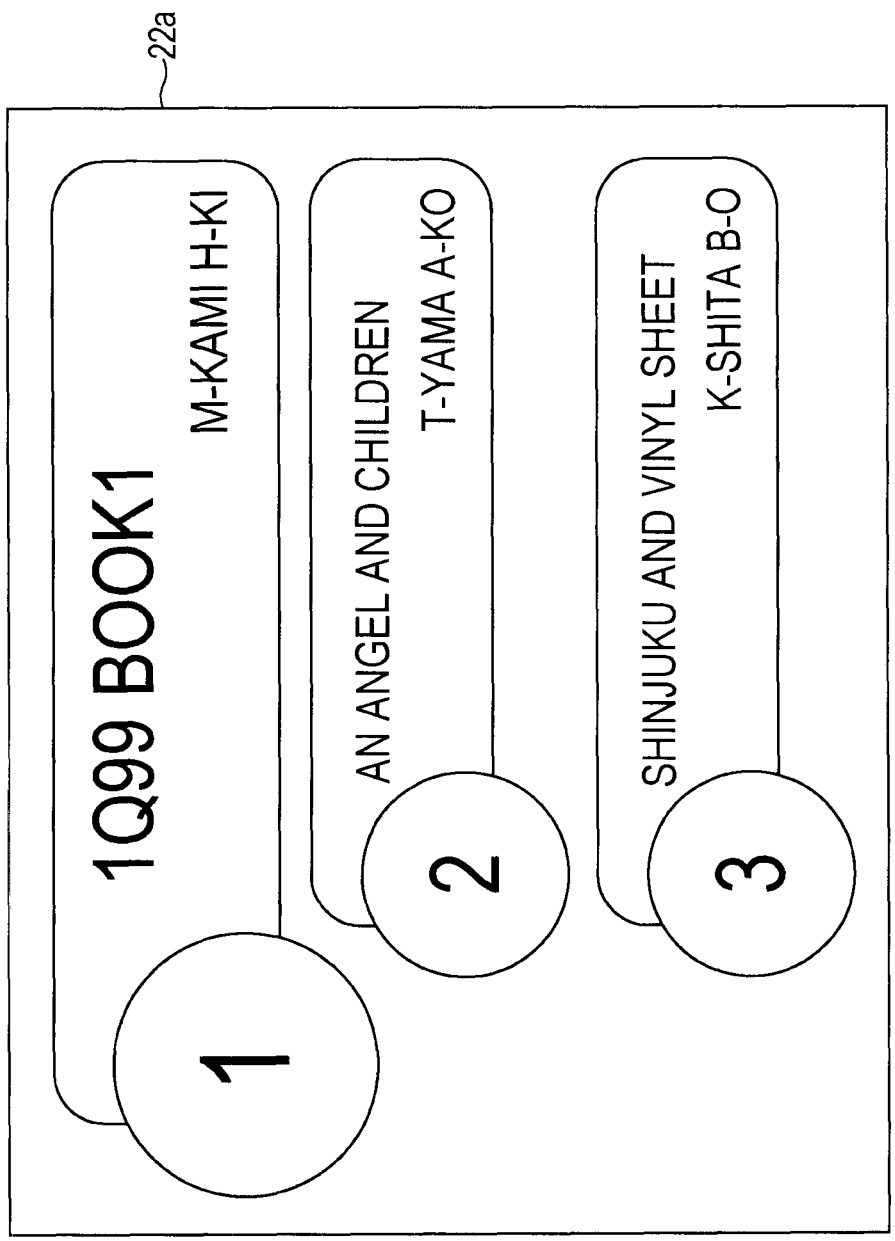
FIG. 2 is a first diagram illustrating a display example of a display screen.

When the display device 22 detects no person or no front face of a book in a captured image provided from the camera 21, the display device 22 displays, for example, as illustrated in FIG. 2, a ranking indicating the order of popular books on the display screen 22a. That is, the display device 22 displays, for example, as illustrated in FIG. 2, "1. 1Q99 BOOK 1 M-kami H-ki" at the top of the display screen 22a, "2. An Angel and Children T-yama A-ko" in the middle thereof, and "3. Shinjuku and Vinyl Sheet K-shita B-o" at the bottom thereof.

For example, when the display device 22 detects a person in a captured image provided from the camera 21, the display device 22 displays, on the display screen 22a, book information and a POP sentence of a book recommended to the detected person.

Figure 3:
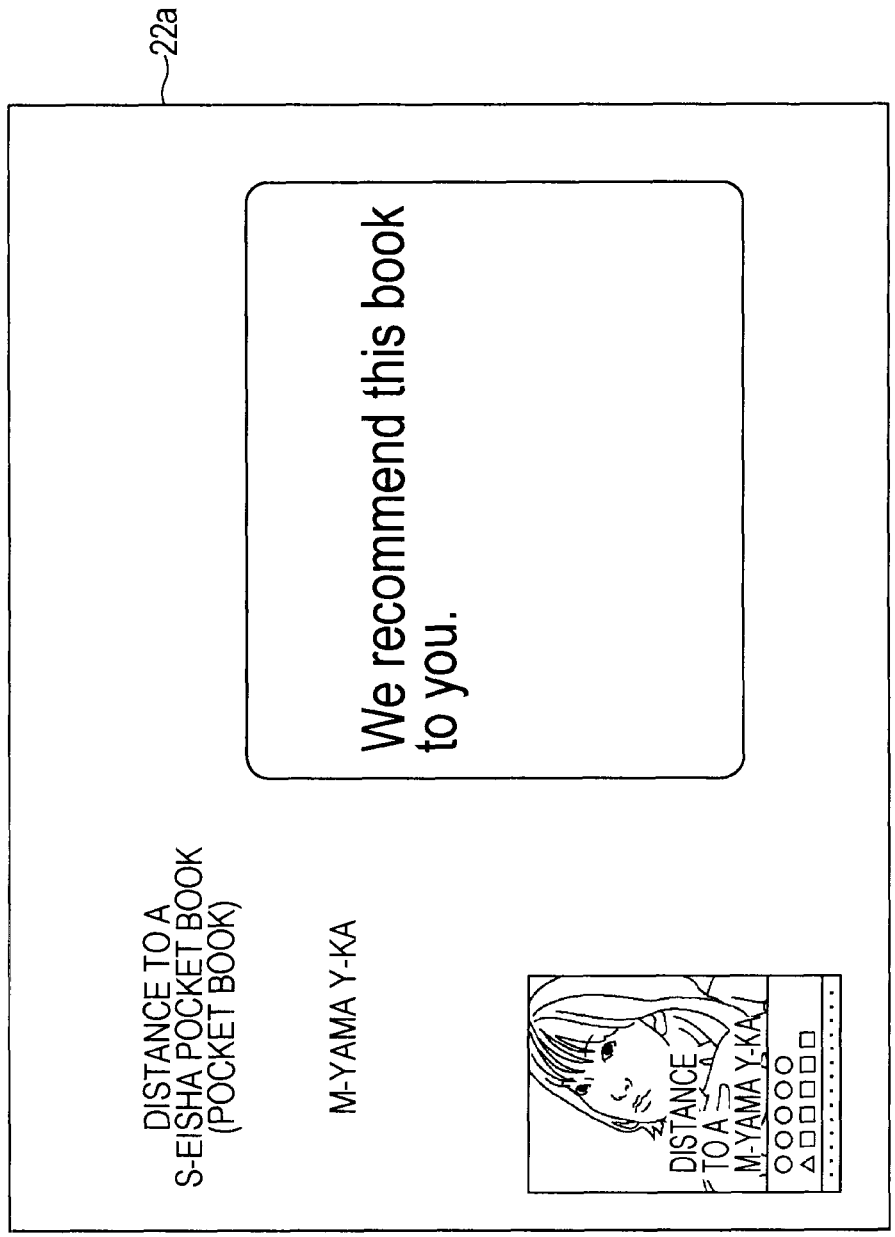
FIG. 3 is a second diagram illustrating a display example of the display screen.

That is, for example, when the display device 22 detects a teenage girl in a captured image provided from the camera 21, the display device 22 displays, as illustrated in FIG. 3, the title of a book recommended to the teenage girl "Distance to A", the publisher name "S-eisha Pocket Book", the author name "M-yama Y-ka", and the front face of the book on the left-hand side of the display screen 22a. Also, the display device 22 displays the POP sentence of the book recommended to the teenage girl, "We recommend this book to you", on the right-hand side of the display screen 22a.

Figure 4:
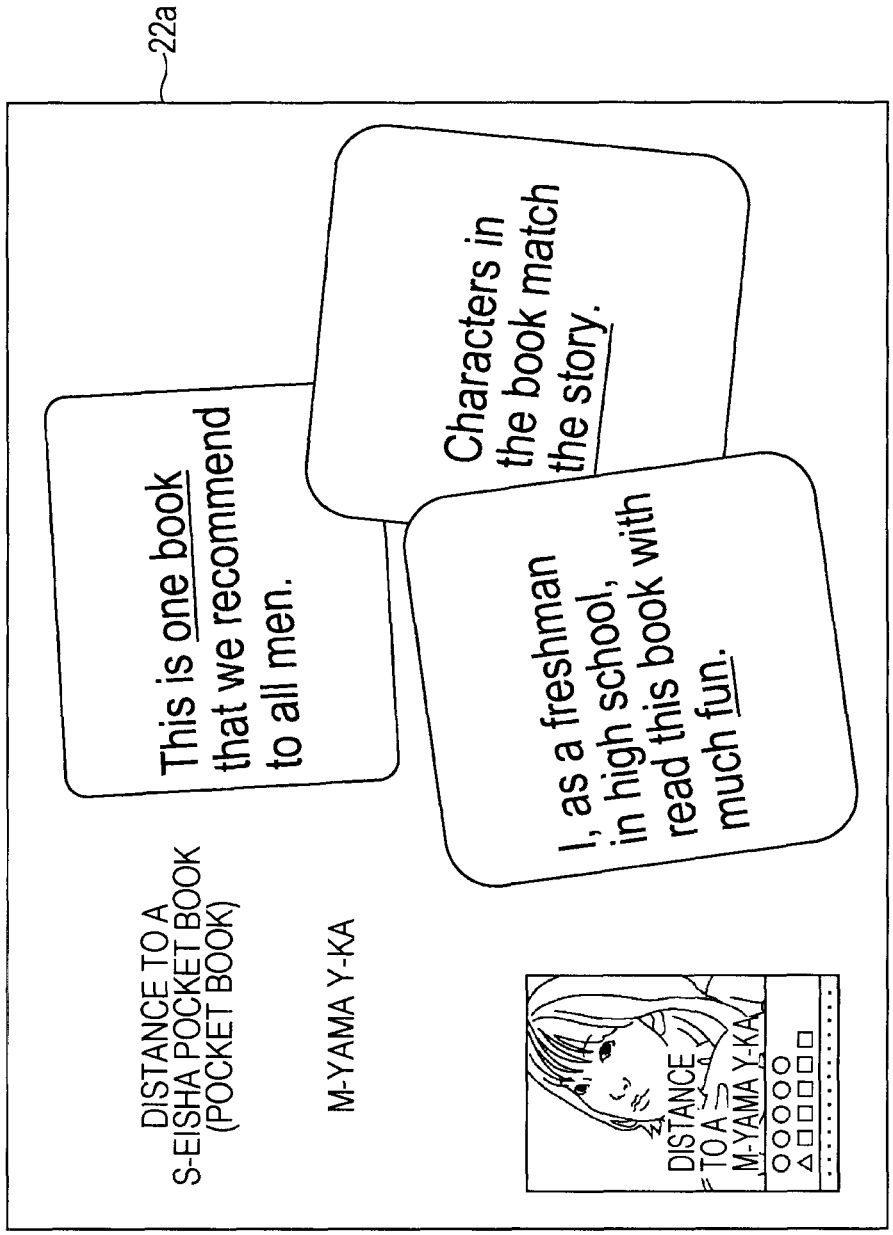
FIG. 4 is a third diagram illustrating a display example of the display screen.

When the display device 22 determines, based on a plurality of captured images supplied from the camera 21, that the teenage girl is gazing at the display screen 22a for a certain time or longer, the display device 22 changes the POP sentence "We recommend this book to you" to, as illustrated in FIG. 4, a plurality of POP sentences "This is one book that we recommend to all men", "I, as a freshman in high school, read this book with much fun", and "Characters in the book match the story", which are more detailed POP sentences, and causes these POP sentences to be displayed.

In FIG. 4, characters to be emphasized are underlined in characters (words) constituting the POP sentences displayed on the display screen 22a. The same applies to FIG. 5, which will be described later.

Alternatively, in order to emphasize characters, instead of being underlined, characters to be emphasized may be displayed in a striking color (e.g., red) different from the other characters.

Further, when the display device 22 detects the front face of a book in a captured image supplied from the camera 21, the display device 22 displays, on the display screen 22a, book information and a POP sentence of a book corresponding to the detected front face.

That is, for example, when the display device 22 detects the front face of a book, the display device 22 displays book information and a POP sentence of a book corresponding to the detected front face.

Figure 5:
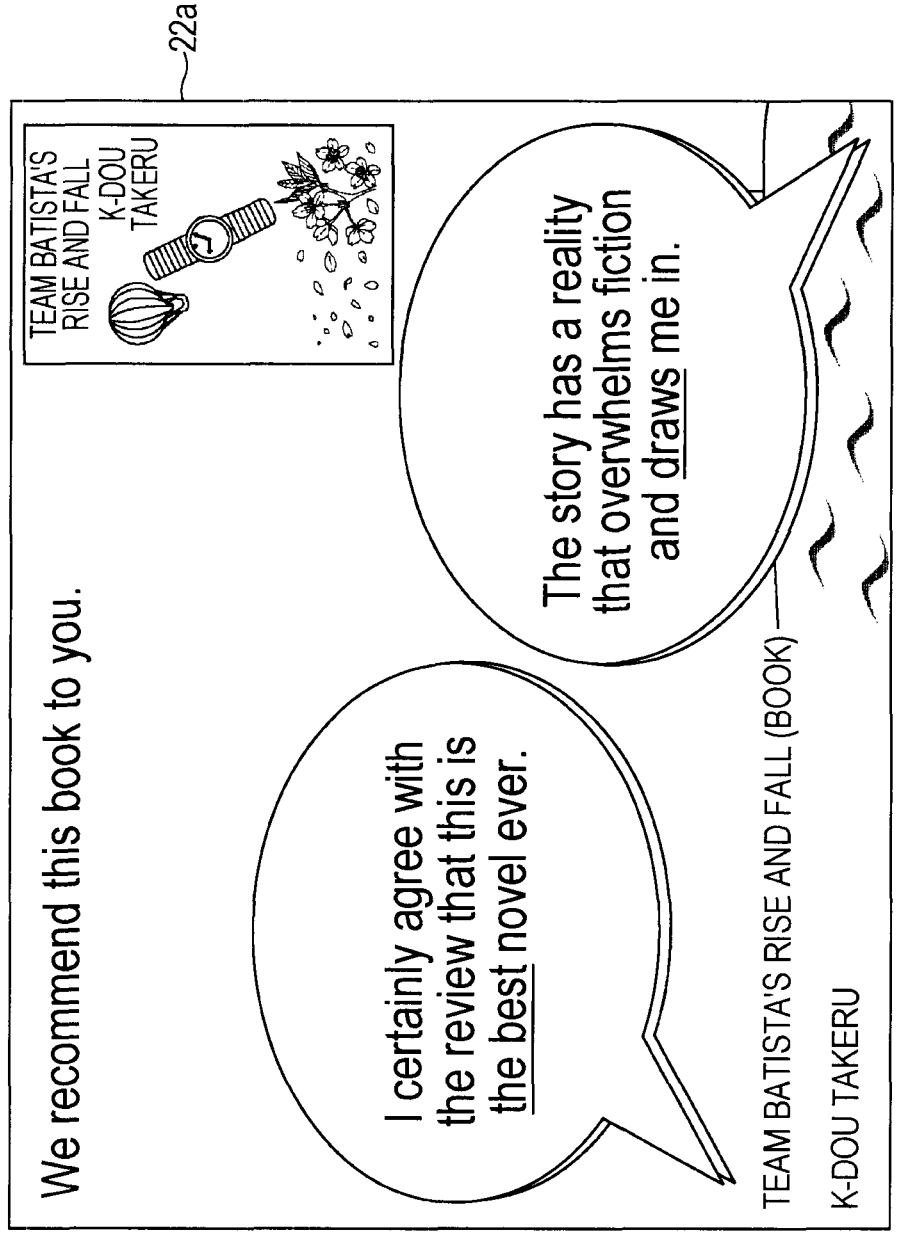
FIG. 5 is a fourth diagram illustrating a display example of the display screen.

Specifically, for example, the display device 22 displays, as illustrated in FIG. 5, the detected front face in the upper right-hand corner of the display screen 22a, the title of a book corresponding to the detected front face "Team Batista's Rise and Fall" and the author name "K-dou Takeru" in the lower left-hand corner of the display screen 22a, and POP sentences of the book corresponding to the detected front face, "I certainly agree with the evaluation that this is the best novel ever" and "The story has a reality that overwhelms fiction and draws me in", in the middle of the display screen 22a.

For example, when the display device 22 detects the front faces of a plurality of books, the display device 22 displays items of book information and POP sentences of a plurality of books corresponding to the detected front faces.

Figure 6:
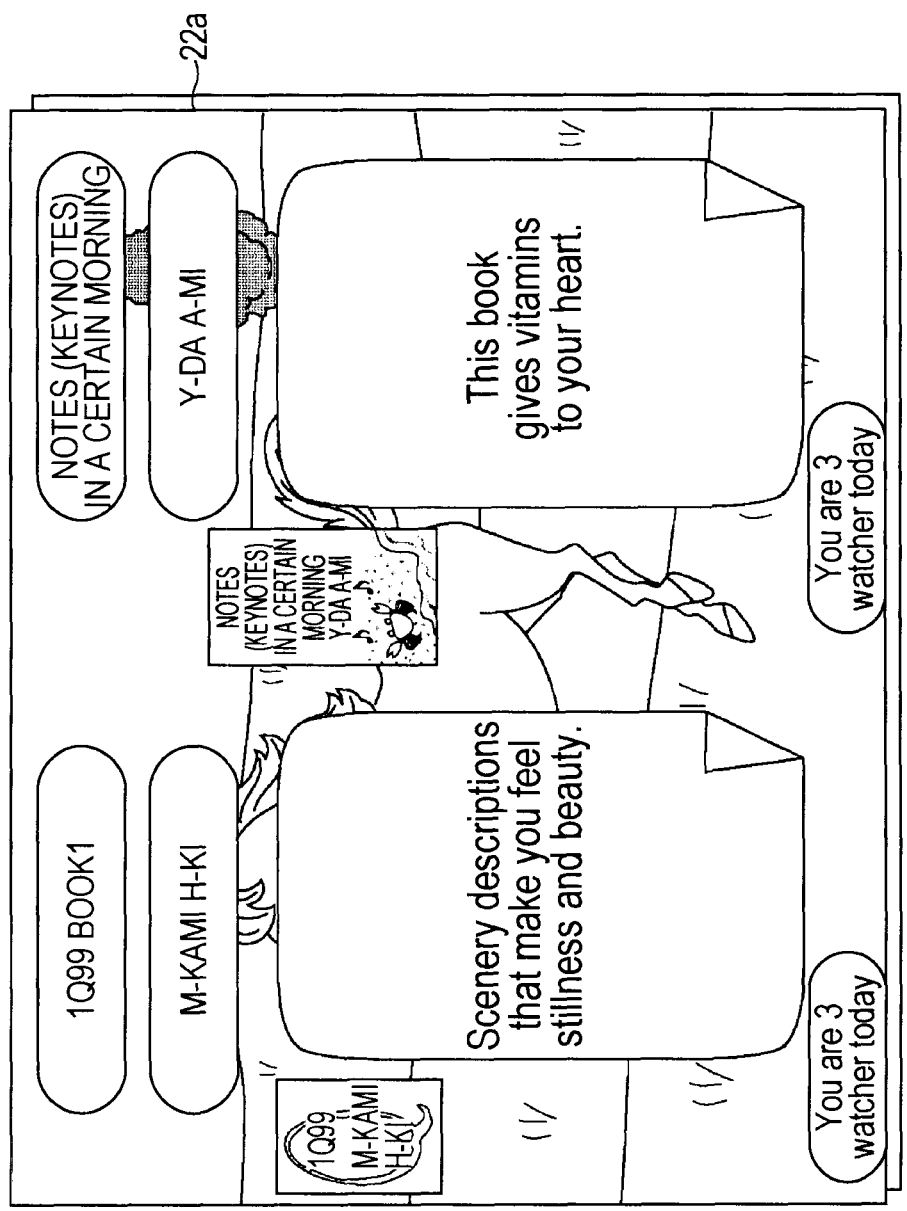
FIG. 6 is a fifth diagram illustrating a display example of the display screen.

Specifically, for example, when the display device 22 detects the front faces of a plurality of books, namely, two books, as illustrated in FIG. 6, the display device 22 displays the title of one of the two books "1Q99 BOOK1", the author name "M-kami H-ki", the front face, and the POP sentence "Scenery descriptions that make you feel stillness and beauty" on the left-hand side of the display screen 22a. Also, the display device 22 displays, as illustrated in FIG. 6, the title of the other book "Notes (Keynotes) in a Certain Morning", the author name "Y-da A-mi", the front face, and the POP sentence "This book gives vitamins to your heart" on the right-hand side of the display screen 22a.

First Example of Configuration of Display Device 22

Figure 7:
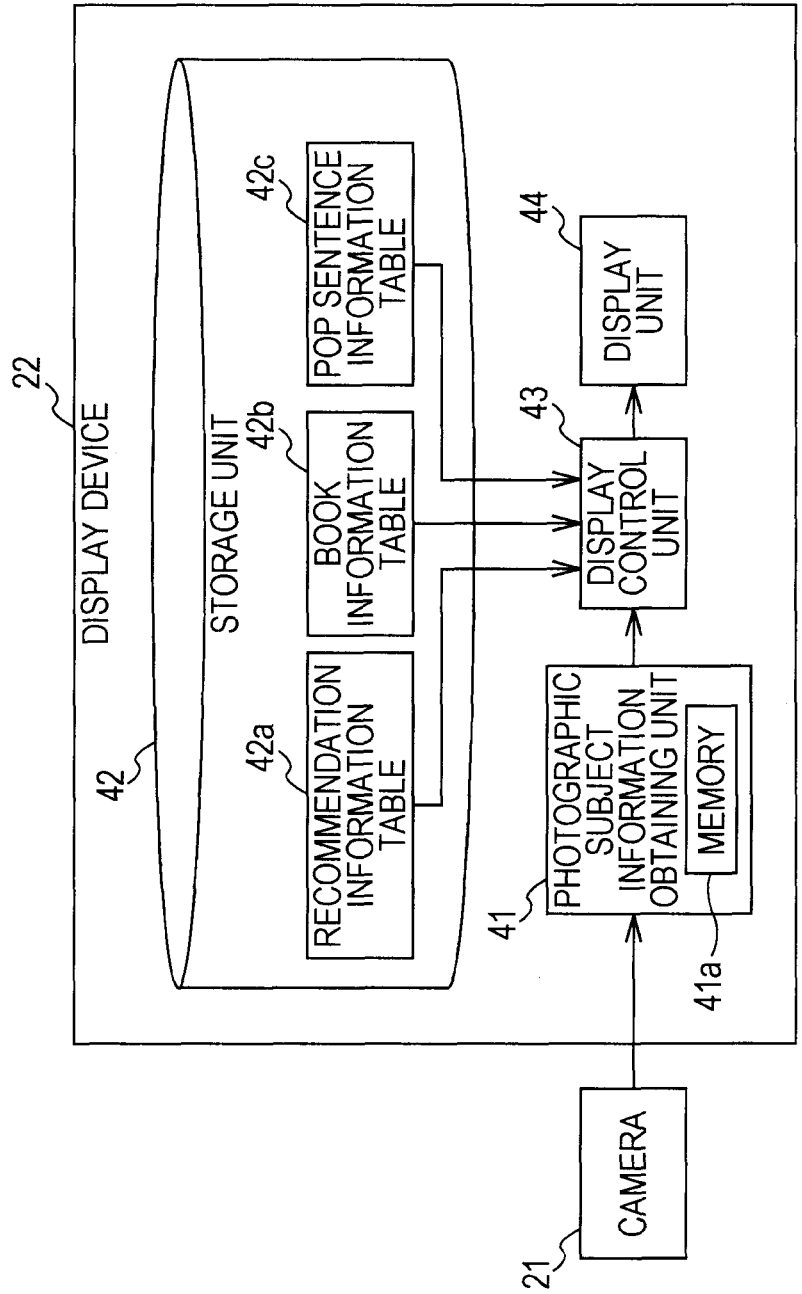
FIG. 7 is a block diagram illustrating a first example of the configuration of a display device according to an embodiment of the present invention.

Next, FIG. 7 illustrates a first example of the configuration of the display device 22 according to the embodiment of the present invention.

The display device 22 includes a photographic subject information obtaining unit 41, a storage unit 42, a display control unit 43, and a display unit 44.

The photographic subject information obtaining unit 41 includes a memory 41a. The memory 41a holds, in advance, detection information that is used for detecting (the face of) a person or the front face of a book.

That is, for example, in order to detect a person, the memory 41a holds, in advance, a feature amount representing a feature of the person (e.g., a face image representing the face of the person) for each attribute identification (ID) in association with each other. Each attribute ID represents an attribute of a person serving as a photographic subject of which an image is captured. The attribute of a person includes at least one of the age, race, facial expression, sex, and the like of the person.

Also, in order to detect the front face of a book, the memory 41a holds, in advance, a feature amount representing a feature of the front face of the book for each book ID in association with each other. Each book ID represents a book corresponding to the front face serving as a photographic subject of which an image is captured.

A captured image is supplied from the camera 21 to the photographic subject information obtaining unit 41. The photographic subject information obtaining unit 41 compares a feature amount held in the built-in memory 41a with a feature amount of a photographic subject existing in the captured image supplied from the camera 21, and tries to detect a person or the front face of a book based on the comparison result.

When a person is detected as a result of this detection, the photographic subject information obtaining unit 41 reads, from the memory 41a, an attribute ID associated with the feature amount used for the detection (feature amount of the detected person) and supplies the attribute ID to the display control unit 43.

Also, the photographic subject information obtaining unit 41 determines whether the detected person is gazing at the display screen 22a for a certain time or longer, based on a plurality of captured images supplied from the camera 21, and supplies the determination result to the display control unit 43.

Further, when the photographic subject information obtaining unit 41 detects the front face of a book as a result of this detection, the photographic subject information obtaining unit 41 reads, from the memory 41a, a book ID associated with the feature amount used for the detection (feature amount of the detected front face) and supplies the book ID to the display control unit 43.

The storage unit 42 holds, in advance, a recommendation information table 42a, a book information table 42b, and a POP sentence information table 42c.

The recommendation information table 42a holds, for each attribute ID, a book ID of a book to be recommended to a person associated with the attribute ID in association with each other.

The book information table 42b holds, for each book ID, book information of a book represented by the book ID in association with each other. Also, the book information table 42b holds, in advance, for each book ID, a background image that suits the atmosphere of the genre of a book represented by the book ID (e.g., when the genre is horror, a background image displaying a ghost or the like) in association with each other.

Further, the book information table 42b holds, in advance, a background image used when a plurality of items of book information are displayed.

The POP sentence information table 42c holds, in advance, for each book ID, a plurality of POP sentences associated with a book represented by the book ID in association with each other. A POP sentence is written using a hand-written-like font, and a word(s) to be emphasized is/are underlined in words constituting the POP sentence.

Also, a method of generating the recommendation information table 42a, the book information table 42b, and the POP sentence information table 42c held in the storage unit 42 is described later with reference to FIGS. 9 and 10.

The display control unit 43 reads, from the storage unit 42, book information, a background image, and a POP sentence to be displayed on the display unit 44, based on an attribute ID or a book ID supplied from the photographic subject information obtaining unit 41.

That is, for example, when an attribute ID is supplied from the photographic subject information obtaining unit 41, the display control unit 43 reads a book ID associated with the attribute ID from the recommendation information table 42a.

The display control unit 43 reads book information and a background image associated with the read book ID from the book information table 42b, and reads a certain POP sentence associated with the read book ID from the POP sentence information table 42c.

For example, when a book ID is supplied from the photographic subject information obtaining unit 41, the display control unit 43 reads book information and a background image associated with the supplied book ID from the book information table 42b, and reads certain POP sentences associated with the supplied book ID from the POP sentence information table 42c.

The display control unit 43 supplies, to the display unit 44, the book information, the background image, and the POP sentence(s) read in association with the attribute ID or the book ID from the photographic subject information obtaining unit 41, and causes the display unit 44 to display the book information, the background image, and the POP sentence(s).

When a determination result from the photographic subject information obtaining unit 41 indicates that a person is gazing at the display screen 22a (the display unit 44) for a certain time or longer, as illustrated in FIG. 4 above, the display control unit 43 changes the POP sentence being displayed on the display unit 44 to more detailed POP sentences and causes the more detailed POP sentences to be displayed.

Specifically, from among POP sentences associated with the book ID of the book corresponding to the book information being displayed on the display unit 44, the display control unit 43 reads, from the POP sentence information table 42c, POP sentences that are more detailed than the POP sentence being displayed on the display unit 44. The display control unit 43 causes the read POP sentences, instead of the POP sentence being displayed on the display unit 44, to be newly displayed.

In the POP sentence information table 42c, a degree indicating detailedness is associated with each POP sentence. Therefore, the display control unit 43 can read POP sentences that are more detailed than the POP sentence being displayed on the display unit 44.

The display unit 44 includes, for example, a liquid crystal display (LCD), and displays book information, a background image, and a POP sentence from the display control unit 43 as a display image on the display screen 22a (FIG. 1) of the display unit 44. That is, book information and a POP sentence are displayed with a background image serving as a background on the display screen 22a.

Description of Operation of Display Control Process

Figure 8:
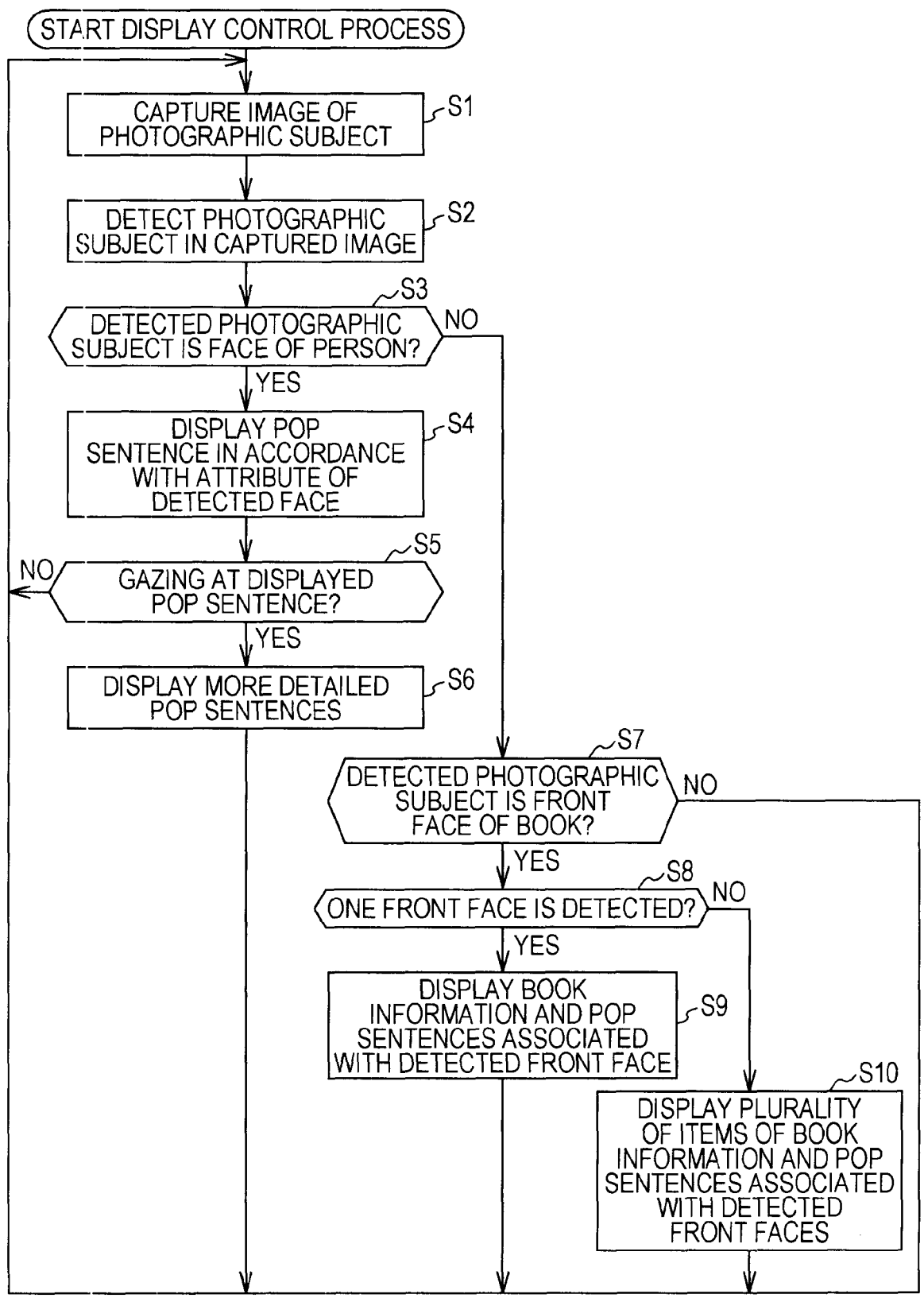
FIG. 8 is a flowchart for describing a display control process.

Referring now to the flowchart of FIG. 8, a display control process performed by the display system 1 will be described in detail.

The display control process is started when, for example, power of the camera 21 and the display device 22 is turned on.

In step S1, the camera 21 captures an image of a photographic subject, and supplies a captured image obtained as a result of this image capturing to the photographic subject information obtaining unit 41 in the display device 22.

In step S2, the photographic subject information obtaining unit 41 compares a feature amount held in the built-in memory 41a with a feature amount of the photographic subject existing in the captured image supplied from the camera 21, and tries to detect a person or the front face of a book based on the comparison result.

In step S3, when a person is detected as the photographic subject as a result of the detection, the photographic subject information obtaining unit 41 reads, from the memory 41a, an attribute ID associated with the feature amount used for the detection (feature amount of the detected person). The photographic subject information obtaining unit 41 supplies the read attribute ID to the display control unit 43, and the flow proceeds to step S4.

When a plurality of persons are detected as photographic subjects, the photographic subject information obtaining unit 41 reads, from the memory 41a, an attribute ID associated with a feature amount of a person that occupies the largest area of the captured image, and supplies the attribute ID to the display control unit 43.

In step S4, the display control unit 43 reads, from the recommendation information table 42a, a book ID associated with the attribute ID supplied from the photographic subject information obtaining unit 41.

The display control unit 43 reads, from the book information table 42b, book information and a background image associated with the read book ID, and reads, from the POP sentence information table 42c, a certain POP sentence associated with the read book ID.

The display control unit 43 supplies the book information, the background image, and the POP sentence read in association with the attribute ID from the photographic subject information obtaining unit 41 to the display unit 44, and causes the display screen 22a as illustrated in FIG. 3 to be displayed.

When a person is detected as a result of the detection, the photographic subject information obtaining unit 41 further determines whether the detected person is gazing at the display screen 22a for a certain time or longer, based on a plurality of captured images supplied from the camera 21. The photographic subject information obtaining unit 41 supplies the determination result to the display control unit 43.

In step S5, when the determination result from the photographic subject information obtaining unit 41 indicates that the person is not gazing at the display screen 22a for the certain time or longer, the flow returns to step S1, and the display control unit 43 repeats similar processing from step S1 onward.

Alternatively, in step S5, when the determination result from the photographic subject information obtaining unit 41 indicates that the person is gazing at the display screen 22a for the certain time or longer, the flow proceeds to step S6.

In step S6, the display control unit 43 reads, from the POP sentence information table 42c, POP sentences that are more detailed than the POP sentence being displayed on the display screen 22a in processing of step S4, supplies the more detailed POP sentences to the display unit 44, and causes the display screen 22a as illustrated in FIG. 4 to be displayed.

After processing in step S6 is completed, the flow returns to step S1, and similar processing from step S1 onward is performed.

When the photographic subject information obtaining unit 41 detects no person in step S3 as a result of processing in step S2, the flow proceeds to step S7.

When the photographic subject information obtaining unit 41 detects no person or no front face of a book in step S7 as a result of processing in step S2, the flow returns to step S1, and similar processing from step S1 onward is repeated.

Alternatively, when the photographic subject information obtaining unit 41 detects the front face of a book in step S7 as a result of processing in step S2, the flow proceeds to step S8.

In step S8, the photographic subject information obtaining unit 41 determines whether the detected front face of a book is the front face of a single book, that is, whether the front face of a single book is detected, or whether the front faces of a plurality of books are detected.

When the photographic subject information obtaining unit 41 determines in step S8 that the detected front face of a book is the front face of a single book, the photographic subject information obtaining unit 41 reads, from the memory 41a, a book ID associated with the feature amount used for the detection (feature amount of the front face of the single book), and supplies the book ID to the display control unit 43. The flow proceeds to step S9.

In step S9, the display control unit 43 reads, from the book information table 42b, book information and a background image associated with the book ID from the photographic subject information obtaining unit 41, and reads, from the POP sentence information table 42c, certain POP sentences associated with the book ID from the photographic subject information obtaining unit 41.

The display control unit 43 supplies the book information, the background image, and the POP sentences read in association with the book ID from the photographic subject information obtaining unit 41 to the display unit 44, and causes the display screen 22a as illustrated in FIG. 5 to be displayed. The flow returns to step S1, and similar processing from step S1 onward is repeated.

When the photographic subject information obtaining unit 41 determines in step S8 that the front faces of a plurality of books are detected, the photographic subject information obtaining unit 41 reads, from the memory 41a, a plurality of book IDs associated with feature amounts used for the detection (feature amounts of the front faces of the books), and supplies the book IDs to the display control unit 43. The flow proceeds to step S10.

In step S10, the display control unit 43 reads, from the book information table 42b, a plurality of items of book information associated with the book IDs from the photographic subject information obtaining unit 41, and reads, from the POP sentence information table 42c, certain POP sentences associated with the book IDs from the photographic subject information obtaining unit 41.

When the book IDs are supplied from the photographic subject information obtaining unit 41, the display control unit 43 reads, from the book information table 42b, a background image used when the display screen 22a as illustrated in FIG. 6 is displayed.

The display control unit 43 supplies the plurality of items of book information, the background image, and the POP sentences read in association with the book IDs from the photographic subject information obtaining unit 41 to the display unit 44, and causes the display screen 22a as illustrated in FIG. 6 to be displayed. The flow returns to step S1, and similar processing from step S1 onward is repeated.

This display control process is terminated when, for example, power of the camera 21 and the display device 22 is turned off.

As described above, with the display control process, book information and a POP sentence to be displayed on the display screen 22a of the display device 22 are changed in accordance with a photographic subject detected in a captured image obtained by image capturing performed by the camera 21.

Therefore, for example, unlike POP advertisements in a book store which describe comments on read books and book information, book information and a POP sentence of a book to be recommended to each person (customer) who visits the book store can be suitably displayed in accordance with the attribute such as the age or sex of the person.

Display similar to hand-written POP advertisements written by employees working at a book store is displayed on the display screen 22a of the display device 22 in accordance with a photographic subject detected in a captured image. Therefore, it saves the employees' effort of writing POP advertisements.

Further, when book information and a POP sentence to be displayed on the display screen 22a are displayed as a moving image using flash or the like, more attention can be drawn from a customer, compared with the case where such information is displayed as a still image. Therefore, the customer can be more prompted to purchase books.

In the display control process, when the front face of a book is detected, book information of a book corresponding to the detected front face is displayed on the display screen 22a. Therefore, book information desired by a certain person can be easily displayed by detecting, in a captured image obtained as a result of image capturing performed by the camera 21, the front face of a book in which the certain person shows an interest.

Figure 9:
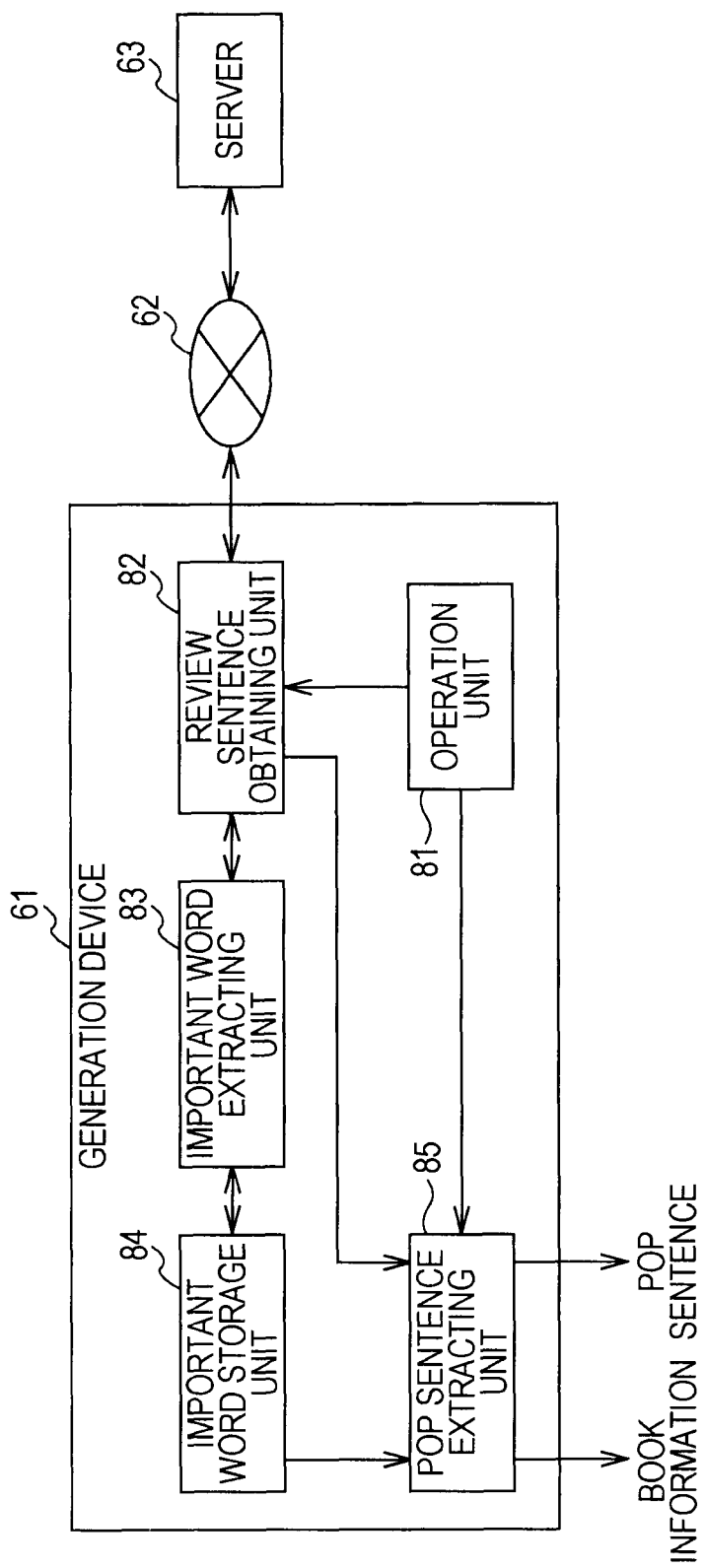
FIG. 9 is a block diagram illustrating a first example of the configuration of a generation device.
Figure 10:
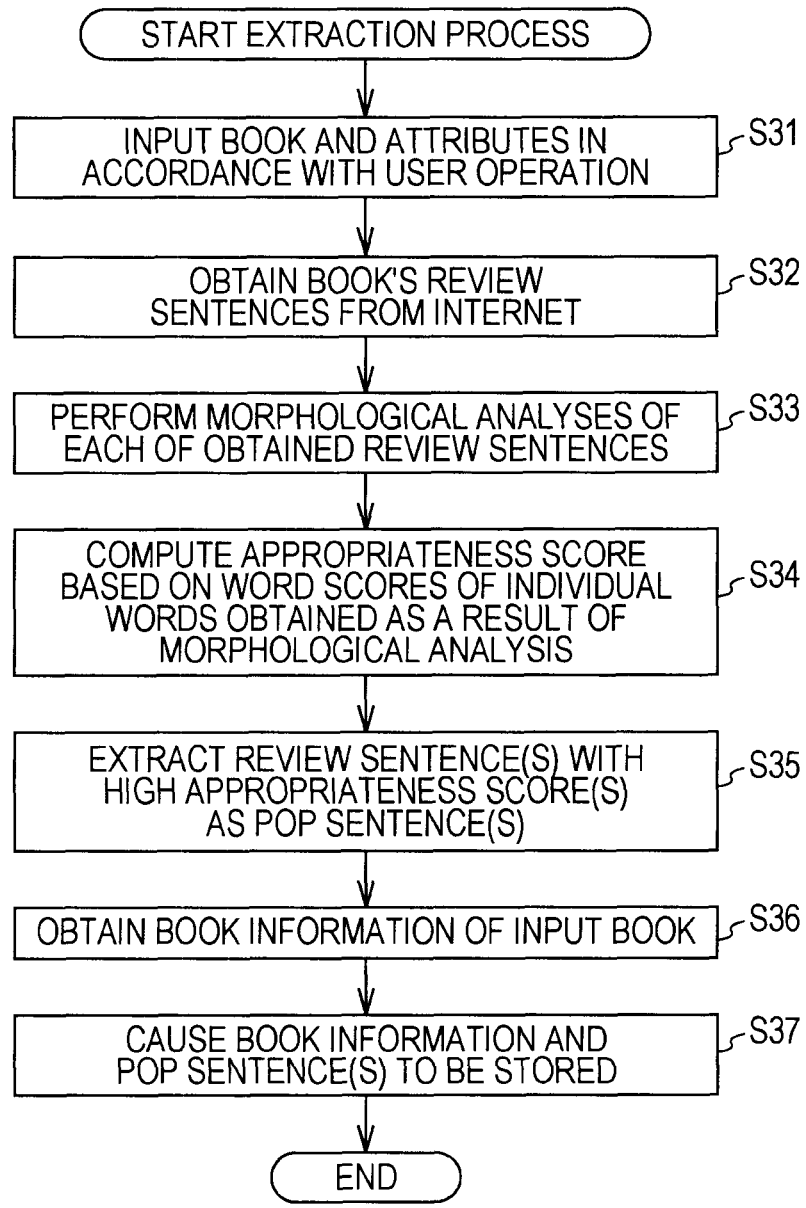
FIG. 10 is a flowchart for describing an extraction process.

Referring now to FIGS. 9 and 10, a method of generating the recommendation information table 42a, the book information table 42b, and the POP sentence information table 42c will be described.

Example of Configuration of Generation Device 61

FIG. 9 illustrates a first example of the configuration of a generation device 61 that generates the recommendation information table 42a, the book information table 42b, and the POP sentence information table 42c.

The generation device 61 is mutually connected to a server 63 via a network 62 such as the Internet. The generation device 61 includes an operation unit 81, a review sentence obtaining unit 82, an important word extracting unit 83, an important word storage unit 84, and a POP sentence extracting unit 85.

The server 63 holds, for each book ID, a background image corresponding to the genre of a book represented by the book ID, and holds a background image when a plurality of items of book information are displayed.

The server 63 also holds, for each book ID, book information of the book. The server 63 further holds, for each book ID, a plurality of comments representing impressions and thoughts of persons who have bought the book, together with the persons' evaluations of the book.

A comment includes a plurality of review sentences. To each of the review sentences, label information indicating whether the review sentence is an affirmative review sentence or a negative review sentence is added in advance by an employee working at a book store or the like.

Here, affirmative review sentences include, for example, review sentences whose details praise the book and review sentences that recommend purchasing the book. Negative review sentences are review sentences obtained by excluding the affirmative review sentences from the review sentences.

The operation unit 81 includes, for example, an operation button, and the operation unit 81 is operated by a user (e.g., an employee at a book store).

That is, for example, using the operation unit 81, the user performs a designation operation of designating a book to be recommended and an attribute of a person to which the book is to be recommended.

In this case, the operation unit 81 supplies a book ID of a book designated by a designation operation performed by the user to the review sentence obtaining unit 82 and the POP sentence extracting unit 85. Also, the operation unit 81 supplies an attribute ID of an attribute designated by a designation operation performed by the user to the POP sentence extracting unit 85.

Further, for example, the user performs a specification operation of specifying the font of a POP sentence. In this case, the operation unit 81 supplies font information indicating a font specified by a specification operation performed by the user to the POP sentence extracting unit 85.

The review sentence obtaining unit 82 obtains book information and a background image associated with the book ID from the operation unit 81, and a background image when a plurality of items of book information are displayed, from the server 63 via the network 62, and supplies the obtained book information and the background images to the POP sentence extracting unit 85.

Also, the review sentence obtaining unit 82 obtains, from among a plurality of comments associated with the book ID from the operation unit 81, a comment(s) whose evaluation is greater than or equal to a certain evaluation threshold, from the server 63 via the network 62. Further, the review sentence obtaining unit 82 divides each of the obtained comments into a plurality of review sentences.

Based on label information added to each of the review sentences obtained as a result of division, the review sentence obtaining unit 82 selects an affirmative review sentence(s) from among the review sentences and supplies the affirmative review sentence(s) to the POP sentence extracting unit 85.

Before the user performs a designation operation, the review sentence obtaining unit 82 obtains, for each book ID held in the server 63, a comment(s) whose evaluation is greater than or equal to the certain evaluation threshold from among a plurality of comments, from the server 63 via the network 62.

The review sentence obtaining unit 82 divides each of the obtained comments into a plurality of review sentences, and supplies the review sentences obtained as a result of division to the important word extracting unit 83.

Based on label information added to each of the review sentences supplied from the review sentence obtaining unit 82, the important word extracting unit 83 discriminates whether each of the review sentences supplied from the review sentence obtaining unit 82 is an affirmative review sentence or a negative review sentence.

For each of the review sentences supplied from the review sentence obtaining unit 82, the important word extracting unit 83 performs a morphological analysis that divides the review sentence into words. Using equation (1), the important word extracting unit 83 computes a word score score(word) of a certain word obtained by the morphological analysis:

$$\text{score(word)} = \left( \frac{\text{positive(word)} + 1}{\sum \text{positive}} * \frac{\sum \text{negative}}{\text{negative(word)} + 1} \right) * \log_{10}\left( \frac{\text{reviews}}{\{r : r \supset \text{word}\}} \right) \quad (1)$$

In equation (1), * denotes multiplication; Σpositive denotes the total number of words included in an affirmative review sentence(s) among review sentences supplied from the review sentence obtaining unit 82; and positive(word) denotes the number of times the certain word is included in the affirmative review sentence(s).

Therefore, {positive(word)+1}/Σpositive becomes a greater value when the certain word is included more in the affirmative review sentence(s).

Further, in equation (1), Σnegative denotes the total number of words included in a negative review sentence(s) among the review sentences supplied from the review sentence obtaining unit 82, and negative(word) denotes the number of times the certain word is included in the negative review sentence(s).

Therefore, Σnegative/{negative(word)+1} becomes a smaller value when the certain word is included more in the negative review sentence(s).

Also, in equation (1), reviews denotes the total number of review sentences supplied from the review sentence obtaining unit 82, and {r:r⊂word} denotes the number of review sentences including the certain word among the review sentences supplied from the review sentence obtaining unit 82.

Therefore, $\log_{10}$ {reviews/(r:r⊂word)} becomes a relatively small value when the certain word is included in too many review sentences. This indicates that, when the certain word is included in too many review sentences, this word is highly likely not to be important.

In the right side of equation (1), 1 is added to positive (word) in order to prevent the word score score(word) from becoming 0 when positive(word) is 0. Further, 1 is added to negative(word) in order to prevent the denominator from becoming 0 when negative(word) is 0.

The important word extracting unit 83 supplies the word score score(word) computed using equation (1) to the important word storage unit 84, and causes the important word storage unit 84 to store the word score in association with the certain word.

The important word storage unit 84 stores (holds) the word score score(word) from the important word extracting unit 83 in association with the certain word.

The POP sentence extracting unit 85 extracts, as a POP sentence(s), a review sentence(s) that satisfies a certain condition from among affirmative review sentences supplied from the review sentence obtaining unit 82. A POP sentence(s) is/are extracted from among affirmative review sentences because it is understood from an experiment conducted by the inventors of the present invention that affirmative review sentences can also be used as POP sentences (in most cases).

That is, for example, the POP sentence extracting unit 85 performs a morphological analysis of each of affirmative review sentences from the review sentence obtaining unit 82, and reads a word score score(word) associated with each of words obtained as a result of the morphological analysis from the important word storage unit 84.

The POP sentence extracting unit 85 computes an added score by adding the read word scores score(word) of the individual words. The POP sentence extracting unit 85 divides the computed added score by the number of word scores score(word) added, and obtains the quotient (average of the word scores) as an appropriateness score representing the degree of how the review sentence is appropriate as a POP sentence.

The POP sentence extracting unit 85 extracts, as a POP sentence(s), a review sentence(s) corresponding to an appropriateness score that is greater than or equal to a certain appropriateness threshold, from among appropriateness scores individually computed for the affirmative review sentences supplied from the review sentence obtaining unit 82.

Also, the POP sentence extracting unit 85 changes, based on font information from the operation unit 81, the font of the extracted POP sentence(s) to a font associated with the font information.

The POP sentence extracting unit 85 underlines, among a plurality of words constituting the POP sentence(s) whose font has been changed, a word(s) whose word score score (word) is greater than or equal to a certain score threshold in order to emphasize that word(s).

The POP sentence extracting unit 85 causes the POP sentence information table 42c to store the underlined POP sentence(s) in association with the book ID supplied from the operation unit 81.

Also, for example, the POP sentence extracting unit 85 causes the book information table 42b to store the book information and the background image from the review sentence obtaining unit 82 in association with the book ID supplied from the operation unit 81. Further, the POP sentence extracting unit 85 causes the book information table 42b to store the background image when a plurality of items of book information are displayed, which is supplied from the review sentence obtaining unit 82.

Also, for example, the POP sentence extracting unit 85 causes the recommendation information table 42a to store the attribute ID and the book ID supplied from the operation unit 81 in association with each other.

Description of Operation of Extraction Process

Referring now to FIG. 10, an extraction process performed by the generation device 61 of FIG. 9 will be described.

The extraction process is started when, for example, a user performs, using the operation unit 81, a designation operation of designating a book to be recommended and an attribute of a person to which the book is to be recommended.

It is assumed that, when the extraction process is started, the word score score(word) of each word is already held in the important word storage unit 84 as a result of processing performed by the review sentence obtaining unit 82 and the important word extracting unit 83.

In step S31, the operation unit 81 supplies the book ID of a book designated by a designation operation performed by the user to the review sentence obtaining unit 82 and the POP sentence extracting unit 85. Also, the operation unit 81 supplies the attribute ID of an attribute designated by a designation operation performed by the user to the POP sentence extracting unit 85.

In step S32, the review sentence obtaining unit 82 obtains book information and a background image associated with the book ID from the operation unit 81, and a background image when a plurality of items of book information are displayed, from the server 63 via the network 62, and supplies the book information and the background images to the POP sentence extracting unit 85.

Also, the review sentence obtaining unit 82 obtains, from among a plurality of comments associated with the book ID from the operation unit 81, a comment(s) whose evaluation is greater than or equal to a certain evaluation threshold, from the server 63 via the network 62. Further, the review sentence obtaining unit 82 divides each of the obtained comments into a plurality of review sentences.

Based on label information added to each of the review sentences obtained as a result of division, the review sentence obtaining unit 82 selects an affirmative review sentence(s) from among the review sentences and supplies the affirmative review sentence(s) to the POP sentence extracting unit 85.

In step S33, for example, the POP sentence extracting unit 85 performs a morphological analysis of each of the affirmative review sentence(s) from the review sentence obtaining unit 82, and reads a word score score(word) associated with each of words obtained as a result of the morphological analysis from the important word storage unit 84.

In step S34, the POP sentence extracting unit 85 computes an added score by adding the read word scores score(word) of the individual words. The POP sentence extracting unit 85 divides the computed added score by the number of word scores score(word) added, and obtains the quotient (average of the word scores) as an appropriateness score representing the degree of how the review sentence is appropriate as a POP sentence.

In step S35, the POP sentence extracting unit 85 extracts, as a POP sentence(s), a review sentence(s) corresponding to an appropriateness score that is greater than or equal to a certain appropriateness threshold, from among appropriateness scores individually computed for the affirmative review sentences supplied from the review sentence obtaining unit 82.

When the user performs a specification operation of specifying, for example, the font of a POP sentence, the operation unit 81 supplies font information indicating the font specified by the specification operation performed by the user to the POP sentence extracting unit 85.

The POP sentence extracting unit 85 changes, based on font information from the operation unit 81, the font of the extracted POP sentence(s) to a font associated with the font information.

The POP sentence extracting unit 85 underlines, among a plurality of words constituting the POP sentence(s) whose font has been changed, a word(s) whose word score score (word) is greater than or equal to a certain score threshold in order to emphasize that word(s).

In step S36, the POP sentence extracting unit 85 obtains the book information and the background image, and the background image when a plurality of items of book information are displayed, which are from the review sentence obtaining unit 82.

In step S37, the POP sentence extracting unit 85 causes the PCP sentence information table 42c to store the POP sentence (s) underlined as a result of processing in step S35, in association with the book ID supplied from the operation unit 81.

Also, the POP sentence extracting unit 85 causes the book information table 42b to store the book information and the background image from the review sentence obtaining unit 82 in association with the book ID supplied from the operation unit 81. Further, the POP sentence extracting unit 85 causes the book information table 42b to store the background image when a plurality of items of book information are displayed, which is from the review sentence obtaining unit 82.

Also, for example, the POP sentence extracting unit 85 causes the recommendation information table 42a to store the attribute ID and the book ID supplied from the operation unit 81 in association with each other.

As described above, in the extraction process, a POP sentence(s) is/are selected from among affirmative review sentences in accordance with a designation operation performed by the user, and book information and the like of a book associated with the POP sentence(s) are obtained, thereby generating the recommendation information table 42a, the book information table 42b, and the POP sentence information table 42c.

Therefore, in the extraction process, tables necessary for generating a display image displayed on the display screen 22a can be easily generated in accordance with a designation operation performed by the user.

That is, a review sentence that may serve as a POP sentence can be selected from among a plurality of review sentences constituting each comment held in the server 63, without involving a person's effort of finding such a review sentence using the person's eyes, and tables necessary for generating a display image displayed on the display screen 22a can be generated.

2. Modifications

In the present embodiment, when the same book ID is associated with attribute IDs of persons with different attributes in the recommendation information table 42a, for example, the same POP sentence is displayed, regardless of each person's attribute, as a certain POP sentence associated with the book ID. However, the embodiment is not limited to the above case.

That is, for example, even when the same book ID is associated with attribute IDs of persons with different attributes in the recommendation information table 42a, (catchy) POP sentences that may draw the persons belonging to the individual attributes can be displayed in accordance with the persons' attributes.

Specifically, for example, when the attribute of a person indicates that the person is a male in twenties or lower, a POP sentence with impact may be displayed. When the attribute of another person indicates that the person is a male in fifties or higher, a POP sentence describing more details of a book may be displayed. Alternatively, for example, POP sentences in different styles may be displayed in accordance with persons' attributes.

Second Example of Configuration of Display Device 22

Figure 11:
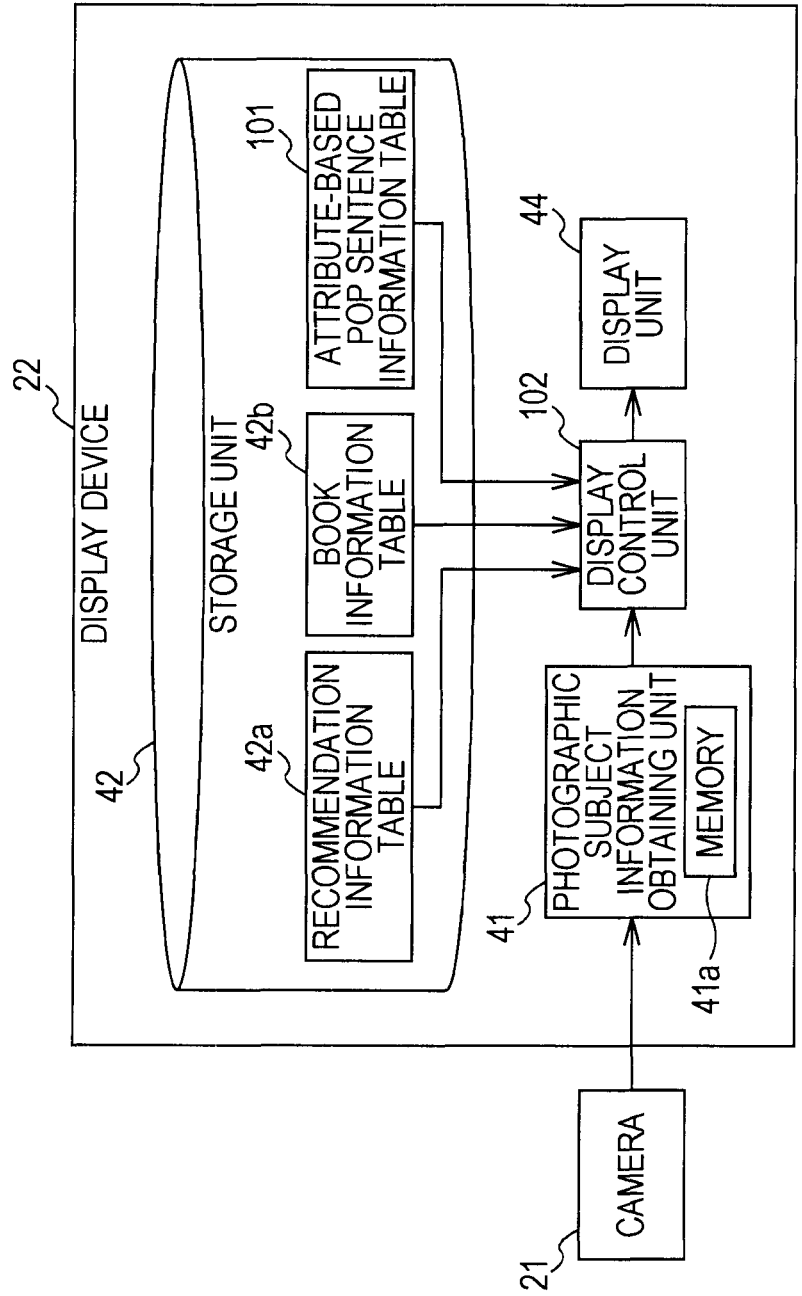
FIG. 11 is a block diagram illustrating a second example of the display device according to the embodiment of the present invention.

Next, FIG. 11 illustrates a second example of the configuration of the display device 22 when displaying a POP sentence that may draw a person's attention in accordance with the attribute of the person.

Since portions of the display device 22 of FIG. 11 that are similarly constructed as the display device 22 of FIG. 7 in the present embodiment are given the same reference numerals, descriptions thereof are omitted. The same applies to FIGS. 12 to 14 described later.

That is, the display device 22 of FIG. 11 is similarly constructed as the display device 22 of FIG. 7 in the present embodiment except for the point that an attribute-based POP sentence information table 101 is provided instead of the POP sentence information table 42c in the storage unit 42, and a display control unit 102 is provided instead of the display control unit 43.

The attribute-based POP sentence information table 101 in the storage unit 42 has, for each of a plurality of attribute IDs, an attribute-based table that holds POP sentences that may draw attention of a person with an attribute represented by the attribute ID.

In the attribute-based table, for each book ID, a plurality of POP sentences in accordance with a person with an attribute represented by each attribute ID are held in advance as a plurality of POP sentences for a book represented by the book ID.

That is, for example, in the attribute-based table, when the attribute of a person that is represented by an attribute ID indicates that the person is a male in twenties or lower, a POP sentence with impact is held; and, when the attribute of another person that is represented by another attribute ID indicates that the person is a male in fifties or higher, a POP sentence describing more details of a book is held.

Besides performing processing similar to that performed by the display control unit 43, the display control unit 102 performs the following processing using the attribute-based POP sentence information table 101 in the storage unit 42.

When an attribute ID is supplied from the photographic subject information obtaining unit 41, the display control unit 102 reads a book ID associated with the attribute ID from the recommendation information table 42a.

The display control unit 102 reads book information and a background image associated with the read book ID from the book information table 42b, and reads a certain POP sentence associated with the read book ID from an attribute-based table (included in the attribute-based POP sentence information table 101) corresponding to the attribute ID from the photographic subject information obtaining unit 41.

Also, when a book ID is supplied from the photographic subject information obtaining unit 41, the display control unit 102 reads a POP sentence associated with the book ID from an attribute-based table corresponding to the most recent attribute ID supplied from the photographic subject information obtaining unit 41. Further, the display control unit 102 reads, from the book information table 42b, book information and a background image associated with the book ID from the photographic subject information obtaining unit 41.

The display control unit 102 supplies the book information, the background image, and the POP sentence read in association with the attribute ID or the book ID from the photographic subject information obtaining unit 41 to the display unit 44 and causes the book information, the background image, and the POP sentence to be displayed.

According to the display device 22 of FIG. 11, even in the case of POP sentences of the same book, a POP sentence in accordance with a person's age or sex can be displayed. Therefore, a more appropriate POP sentence can be displayed for each person.

The attribute-based POP sentence information table 101 is generated by, for example, the generation device 61 of FIG. 9.

In this case, the operation unit 81 to the important word storage unit 84 perform processing similar to that described with reference to FIG. 9, and the POP sentence extracting unit 85 generates the POP sentence information table 42c.

By changing POP sentences held in the generated POP sentence information table 42c to POP sentences in accordance with an attribute designated by a designation operation performed by a user, the POP sentence extracting unit 85 generates an attribute-based table corresponding to an attribute ID of the attribute designated by the designation operation performed by the user.

The POP sentence extracting unit 85 causes the storage unit 42 to store an attribute-based table generated for each attribute ID as the attribute-based POP sentence information table 101.

In the present embodiment, book information and the like of a book to be recommended are displayed. Together with book information and the like of a book to be recommended, book information and the like of a book related to the book to be recommended may be displayed.

Third Example of Configuration of Display Device 22

FIG. 22 illustrates a third example of the configuration of the display device 22 when displaying, besides book information of a book to be recommended, book information of a related book.

Figure 12:
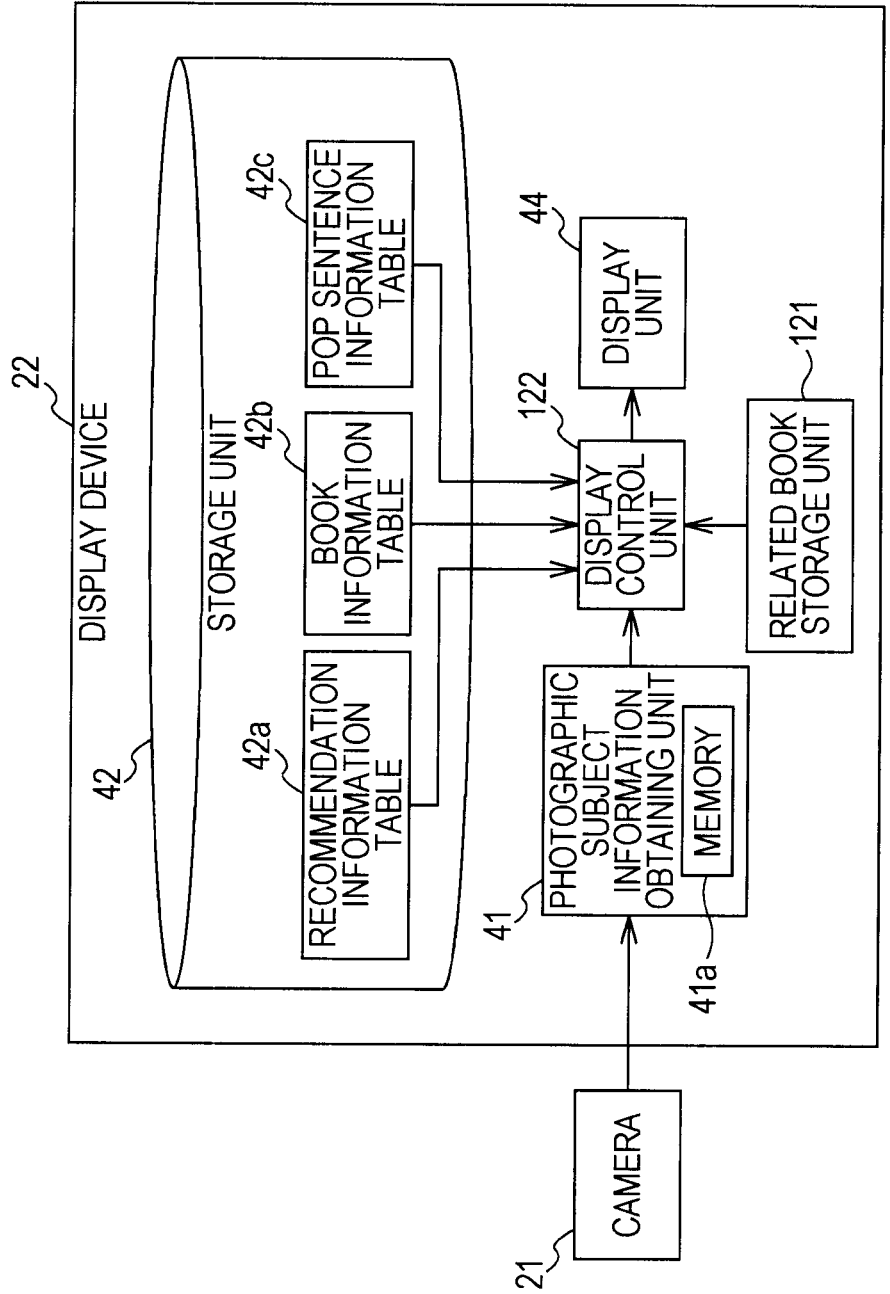
FIG. 12 is a block diagram illustrating a third example of the configuration of the display device according to the embodiment of the present invention.

The display device 22 of FIG. 12 is similarly constructed as the display device 22 of FIG. 7 in the present embodiment except for the point that a related book storage unit 121 is newly provided, and a display control unit 122 is provided instead of the display control unit 43.

The related book storage unit 121 holds, in advance, a book ID of a related book for each book ID. That is, for example, when a person who buys a certain book often tends to buy another book, the related book storage unit 121 holds the book ID of the certain book and the book ID of the other book (hereinafter called "related book ID") in association with each other.

Besides performing processing similar to that performed by the display control unit 43, in response to an attribute ID supplied from the photographic subject information obtaining unit 41, based on a book ID read from the recommendation information table 42a or a book ID from the photographic subject information obtaining unit 41, the display control unit 122 reads a related book ID associated with the book ID from the related book storage unit 121.

The display control unit 122 reads, from the book information table 42b and the POP sentence information table 42c, book information and a POP sentence to be displayed on the display unit 44 in association with the related book ID read from the related book storage unit 121, supplies the book information and the POP sentence to the display unit 44, and causes the book information and the POP sentence to be displayed.

At the same time, the display control unit 122 reads, from the book information table 42b and the POP sentence information table 42c, book information and a POP sentence to be displayed on the display unit 44 in association with the book ID read from the recommendation information table 42a or the book ID from the photographic subject information obtaining unit 41, supplies the book information and the POP sentence to the display unit 44, and causes the book information and the POP sentence to be displayed.

According to the display device 22 of FIG. 12, together with book information and the like of a book to be recommended, book information and the like of a book related to the book to be recommended are displayed. Therefore, POP sentences more desired by a user can be displayed.

In the display device 22, when feature amounts of persons detected as photographic subjects are held and when a person who has been detected before is detected, a display image displayed on the display unit 44 can be changed in accordance with that person's purchase history or the like.

Fourth Example of Configuration of Display Device 22

Figure 13:
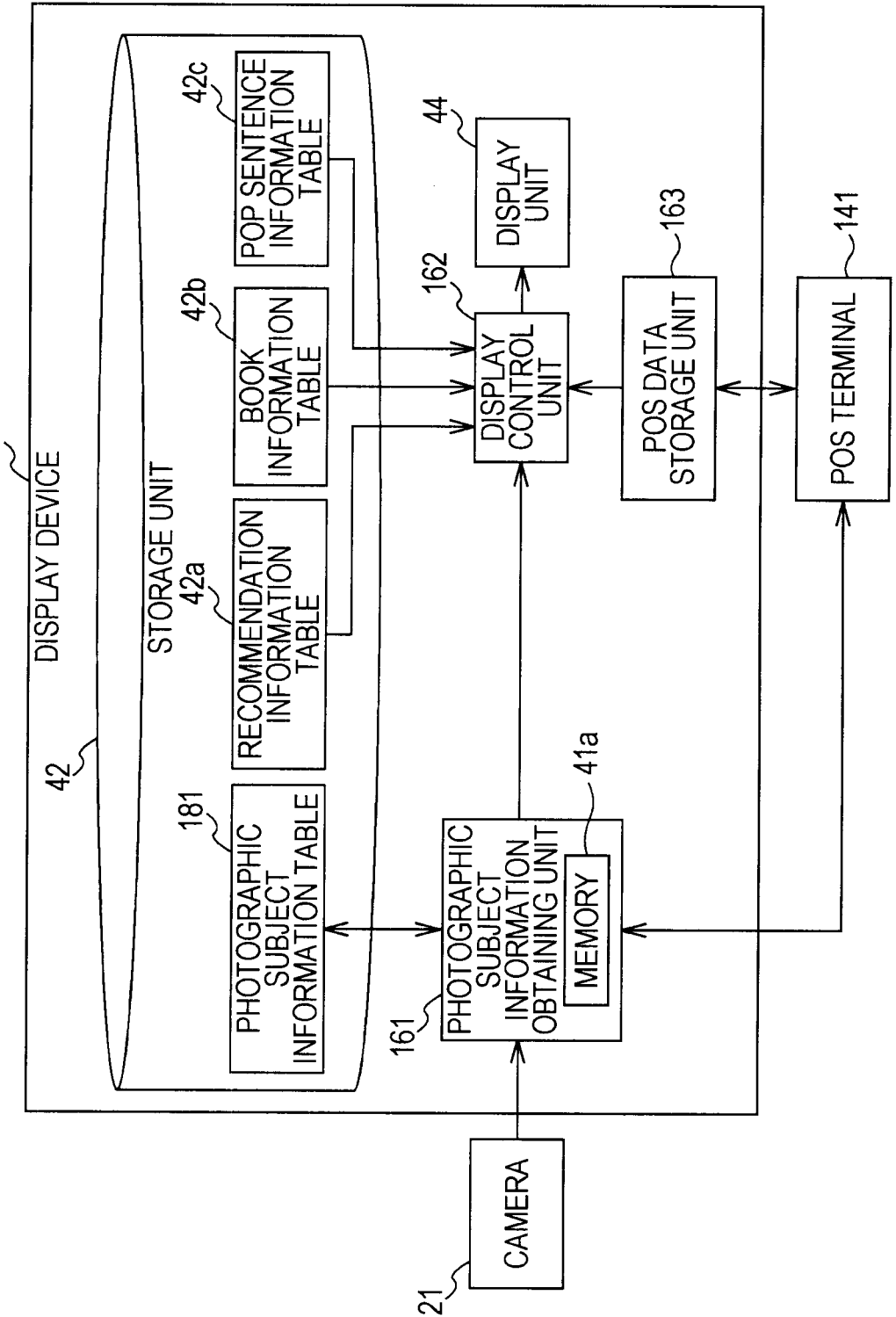
FIG. 13 is a block diagram illustrating a fourth example of the configuration of the display device according to the embodiment of the present invention.

FIG. 13 illustrates a fourth example of the configuration of the display device 22 which changes, when a person who has been detected before is detected, a display image displayed on the display unit 44 in accordance with that person's purchase history or the like.

The display device 22 of FIG. 13 communicates with a point of sales (POS) terminal 141 via wire or wirelessly.

The display device 22 of FIG. 13 includes a photographic subject information obtaining unit 161 and a display control unit 162 instead of the photographic subject information obtaining unit 41 and the display control unit 43. Also, the display device 22 of FIG. 13 newly includes a POS data storage unit 163, and a photographic subject information table 181 in the storage unit 42. The remaining portions of the display device 22 of FIG. 13 are similarly constructed as the display device 22 of FIG. 7 in the present embodiment.

The photographic subject information obtaining unit 161 tries to detect a person in a captured image from the camera 21, based on feature amounts of individual persons who have been detected before, which are held in the photographic subject information table 181.

When the photographic subject information obtaining unit 161 detects a person in the captured image from the camera 21, the photographic subject information obtaining unit 161 reads a person ID (ID uniquely representing the person) associated with a feature amount used for detection (feature amount of the detected person) from the photographic subject information table 181, and supplies the person ID to the display control unit 162.

When the photographic subject information obtaining unit 161 detects no person in the captured image from the camera 21 based on the feature amounts stored (held) in the photographic subject information table 181, the photographic subject information obtaining unit 161 performs processing similar to that performed by the photographic subject information obtaining unit 41.

By performing processing similar to that performed by the photographic subject information obtaining unit 41, the photographic subject information obtaining unit 161 obtains, when a person is detected, a feature amount that represents a feature of that person. The photographic subject information obtaining unit 161 supplies the obtained feature amount in association with the person ID representing the detected person to the photographic subject information table 181 and the POS terminal 141, and causes the feature amount and the person ID to be stored in association with each other.

The photographic subject information table 181 in the storage unit 42 holds, for each person ID, a feature amount of that person in association with each other.

Besides performing processing similar to that performed by the storage unit 42, when a person ID is supplied from the photographic subject information obtaining unit 161, the display control unit 162 reads, based on the person ID, a book purchase history associated with the person ID from the POS data storage unit 163.

Based on the read purchase history, the display control unit 162 determines a book to be displayed on the display unit 44, reads book information and a POP sentence of the determined book from the book information table 42b and the POP sentence information table 42c, supplies the book information and the POP sentence to the display unit 44, and causes the book information and the POP sentence to be displayed.

That is, for example, when the read purchase history indicates that the person has purchased many love stories, the display control unit 162 reads book information and a POP sentence of a book belonging to the genre of love story from the book information table 42b and the POP sentence information table 42c, supplies the book information and the POP sentence to the display unit 44, and causes the book information and the POP sentence to be displayed.

In this case, it is assumed that book IDs and the like are held in the book information table 42b and the POP sentence information table 42c in a manner that the genres of books are distinguishable.

The POS data storage unit 163 holds, for each person ID, a purchase history of books purchased by that person. This purchase history is updated by the POS terminal 141 which communicates with the display device 22.

That is, the POS terminal 141 stores a person ID associated with a feature amount, which is supplied from the photographic subject information obtaining unit 161. Thus, the POS terminal 141 holds the same person ID as that in the photographic subject information table 181 and a feature amount associated with that person ID.

The POS terminal 141 includes a camera. Using the camera which captures an image, the POS terminal 141 captures an image of a person who buys a book. The POS terminal 141 extracts, from the captured image obtained by image capturing, a feature amount of the person who buys the book, and detects a person ID of the person who buys the book by comparing the extracted feature amount with a held feature amount.

The POS terminal 141 supplies the detected person ID together with book information of the book purchased by the person to the POS data storage unit 163, and updates a purchase history associated with the person ID.

According to the display device 22 of FIG. 13, feature amounts of persons who have been detected before are held. When a person who has been detected before is detected the next time, a book to be recommended is determined based on a purchase history or the like of the detected person. Therefore, book information and a POP sentence more desired by the person can be displayed.

Also, in the present embodiment, the generation device 61 of FIG. 9 computes word scores score(word) for (a plurality of review sentences constituting) each comment whose evaluation is greater than or equal to a certain evaluation threshold, from among comments held in the server 63, regardless of the genres of books. However, the embodiment is not limited to the above case.

That is, for example, comments held in the server 63 may be divided into the genres of books, and word scores score (word) may be computed for each of comments divided into the genres of books.

Second Example of Configuration of Generation Device 61

Figure 14:
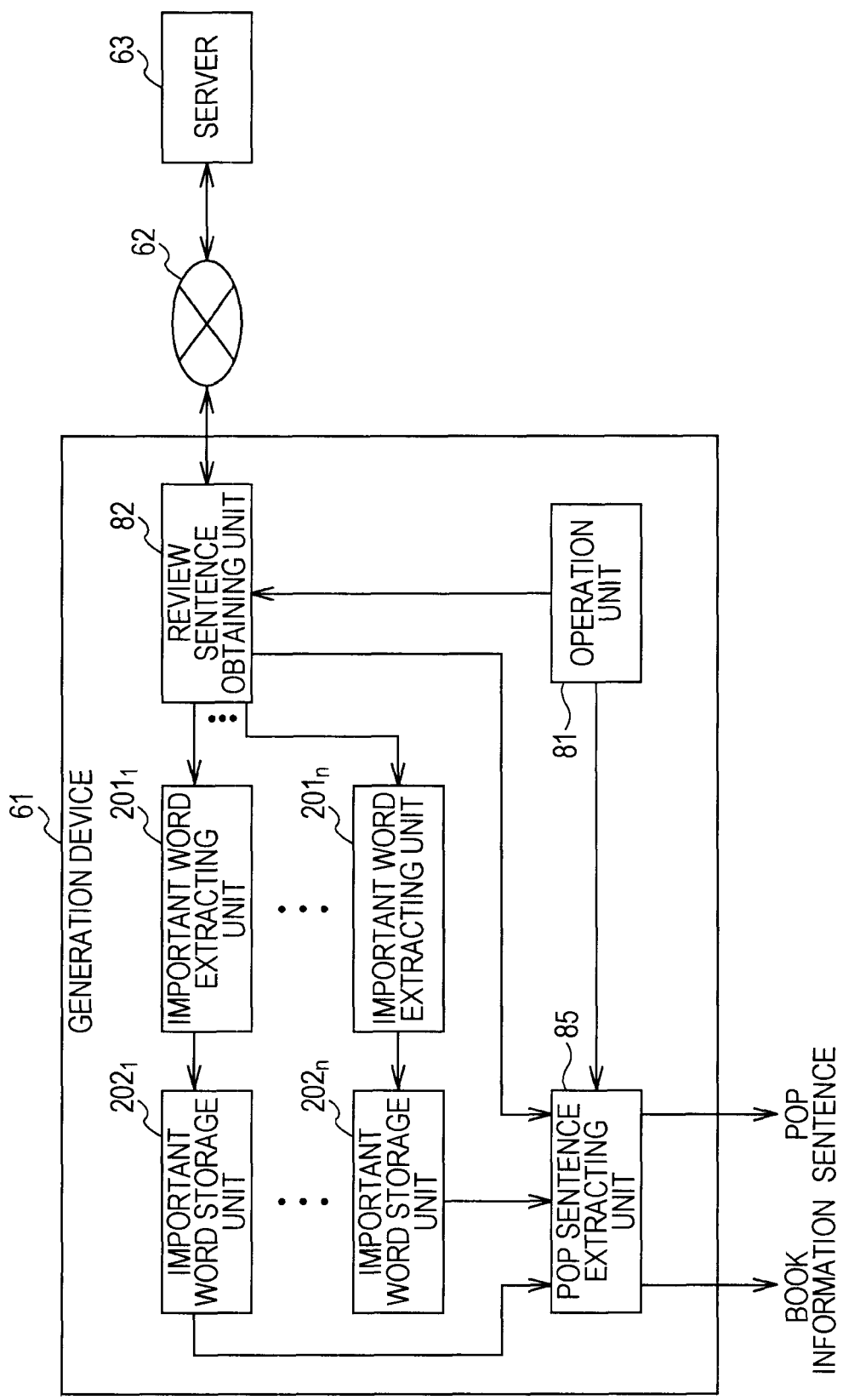
FIG. 14 is a block diagram illustrating a second example of the configuration of the generation device.

Next, FIG. 14 illustrates a second example of the configuration of the generation device 61 which computes a word score score(word) for each of a plurality of review sentences constituting each of comments divided into the genres of books.

The generation device 61 of FIG. 14 is similarly constructed as the case of the first example of the configuration in FIG. 9 except for the point that important word extracting units $201_n$ and important word storage units $202_n$ (n is a natural number ranging from 1 to N) are provided instead of the important word extracting unit 83 and the important word storage unit 84.

A plurality of review sentences obtained by dividing each of comments that are different according to the genres of books are supplied from the review sentence obtaining unit 82 to the respective important word extracting unit $201_n$.

Each of the important word extracting units $201_n$ performs processing similar to that performed by the important word extracting unit 83 based on the review sentences supplied from the review sentence obtaining unit 82, supplies word scores score(word) obtained as a result of the processing to a corresponding one of the important word storage units $202_n$, and causes the word scores score(word) to be stored in association with respective words.

Each of the important word storage units $202_n$ stores (holds) the word scores score(word) from a corresponding one of the important word extracting units $201_n$ in association with respective words.

Accordingly, the word scores score(word) computed based on comments that are different according to the genres of books are held in the respective important word storage units $202_n$.

In this case, according to the generation device 61 of FIG. 14, the POP sentence extracting unit 85 performs a morphological analysis of each of affirmative review sentences from the review sentence obtaining unit 82.

The POP sentence extracting unit 85 reads a word score score(word) associated with each of words obtained as a result of the morphological analysis from one of the important word storage units $202_n$ that holds word scores score (word) computed based on a comment corresponding to the genre of a book represented by a book ID from the operation unit 81, and computes an appropriateness score of each of the review sentences. Based on the computed appropriateness scores, the POP sentence extracting unit 85 extracts, as a POP sentence(s), a review sentence(s) that serve(s) as a POP sentence(s) from among the review sentences.

Therefore, according to the generation device 61 of FIG. 14, for each of the genres of books represented by book IDs from the operation unit 81, word scores score(word) used for computing an appropriateness score are read from a corresponding one of the important word storage units $202_n$. Thus, more appropriate appropriateness scores can be computed for each of the genres of books, and a more appropriate POP sentence(s) can be extracted from among a plurality of review sentences.

In the present embodiment, when a plurality of persons are detected, book information and a POP sentence of a book to be recommended are displayed for, among the plurality of persons, a person who occupies the largest area of a captured image. However, the embodiment is not limited to the above case.

That is, for example, when a plurality of persons are detected, the relationship among the plurality of persons is determined, and, based on the determination result, a book to be recommended can be determined. Specifically, for example, when a couple (man and woman) is detected, the couple (man and woman) may be determined to be lovers. Book information and a POP sentence of a book to be recommended based on this determination result may be displayed.

That is, for example, when the photographic subject information obtaining unit 41 detects a man in twenties and a woman in twenties in a captured image from the camera 21, the photographic subject information obtaining unit 41 supplies an attribute ID associated with the detected man in twenties and an attribute ID of the detected woman in twenties to the display control unit 43.

The display control unit 43 reads, from the recommendation information table 42a, a book ID associated with a combination of the two attribute IDs from the photographic subject information obtaining unit 41. The display control unit 43 reads book information, a POP sentence, and the like associated with the read book ID from the book information table 42b and the POP sentence information table 42c, supplies the book information, the POP sentence, and the like to the display unit 44, and causes the book information, the POP sentence, and the like to be displayed.

In this case, further, it is assumed that a book ID is associated with each of combinations of a plurality of attribute IDs in the recommendation information table 42a. The recommendation information table 42a in which a book ID is associated with each of combinations of a plurality of attribute IDs is generated by the generation device 61 of FIG. 9 or FIG. 14 in response to a user's specification operation of specifying a book ID and a plurality of attribute IDs.

In the present embodiment, the POP sentence extracting unit 85 of FIG. 9 extracts, as a POP sentence(s), a review sentence(s) corresponding to an appropriateness score that is greater than or equal to a certain appropriateness threshold from among affirmative review sentences supplied from the review sentence obtaining unit 82, and causes the POP sentence information table 42c to store the extracted review sentence(s). However, the embodiment is not limited to the above case.

That is, for example, the POP sentence extracting unit 85 can obtain, from among affirmative review sentences supplied from the review sentence obtaining unit 82, a review sentence corresponding to an appropriateness score that is greater than or equal to a certain appropriateness threshold as a review sentence that summarizes the affirmative review sentences.

In this case, when the review sentence extracted by the POP sentence extracting unit 85 is displayed on a Web page (display), rough details described in the affirmative review sentences can be understood without reading all the affirmative review sentences.

In the present embodiment, the description is targeted at POP sentences written in Japanese. Alternatively, an embodiment of the present invention is applicable to POP sentences written in foreign languages such as English. In this case, the generation device 61 of FIG. 9 performs an extraction process on comments written in a foreign language. The same applies to the generation device 61 of FIG. 14.

In the present embodiment, book information and a POP sentence(s) are displayed on the display screen 22a in accordance with a photographic subject detected in a captured image obtained as a result of image capturing performed by the camera 21. However, the embodiment is not limited to the above case.

That is, for example, book information and a POP sentence(s) may be output as sound together with or instead of display thereof in accordance with a photographic subject detected in a captured image obtained as a result of image capturing performed by the camera 21. In this case, book information and a POP sentence(s) can be presented to a blind person in accordance with that person.

In the present embodiment, the display device 22 and the generation device 61 are described as different devices. However, the display device 22 and the generation device 61 can be constructed as a single device. In this case, book information, POP sentences, book IDs, and the like generated by the generation device 61 are stored in the storage unit 42 of the display device 22.

In the present embodiment, the case where book information and a POP sentence(s) are displayed for books has been described. However, information displayed on the display screen 22a is not limited to book information and a POP sentence(s). That is, for example, information displayed on the display screen 22a can be arbitrarily changed in accordance with articles such as household electric appliances, restaurants, and sport facilities as long as comments thereof can be obtained via the network 62 such as the Internet.

Specifically, for example, when household electric appliances are adopted as articles, product information (corresponding to book information) representing the performance of each household electric appliance and an advertisement sentence (corresponding to a POP sentence) prompting a customer to purchase each household electric appliance are displayed on the display screen 22a.

When a place such as a restaurant or a sport facility serves as a target, service information representing a service that can be obtained at that place and an advertisement sentence prompting a person to visit that place are displayed on the display screen 22a.

The above-described series of processes may be executed by dedicated hardware or software. When the series of processes is to be executed by software, a program constituting the software is installed from a recording medium into a so-called embedded computer or, for example, a general personal computer that can execute various functions by using various programs installed therein.

Example of Configuration of Computer

Figure 15:
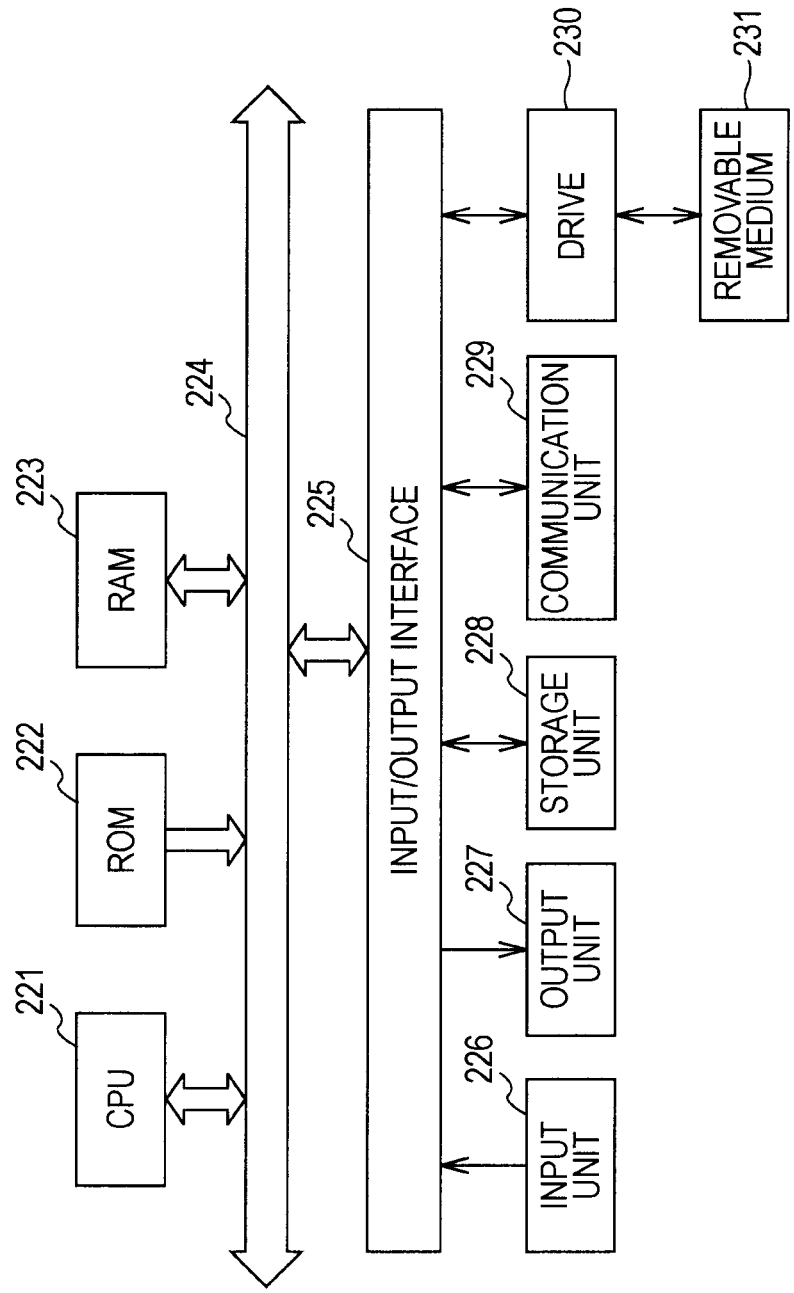
FIG. 15 is a block diagram illustrating an example of the configuration of a computer.

FIG. 15 is a block diagram illustrating an example of the configuration of a personal computer that executes the above-described series of processes by using a program.

A central processing unit (CPU) 221 executes various processes in accordance with a program stored in a read-only memory (ROM) 222 or a storage unit 228. A program executed by the CPU 221 and data are appropriately stored in a random access memory (RAM) 223. The CPU 221, the ROM 222, and the RAM 223 are connected to one another by a bus 224.

Furthermore, an input/output interface 225 is connected to the CPU 221 via the bus 224. An input unit 226 including a keyboard, a mouse, and a microphone and an output unit 227 including a display and a loudspeaker are connected to the input/output interface 225. The CPU 221 executes various processes in response to a command input from the input unit 226. The CPU 221 outputs the result of processing to the output unit 227.

The storage unit 228 connected to the input/output interface 225 is implemented by, for example, a hard disk, and stores a program executed by the CPU 221 and various items of data. A communication unit 229 communicates with an external device via a network such as the Internet or a local area network.

A program may be obtained via the communication unit 229 and stored in the storage unit 228.

A drive 230 connected to the input/output interface 225 drives a removable medium 231 such as a magnetic disk, an optical disk, a magneto-optical disk, or a semiconductor memory when the removable medium 231 is mounted, and the drive 230 obtains a program and data stored in the removable medium 231. The obtained program and data are transferred, as occasion calls, to the storage unit 228 and stored in the storage unit 228.

A recording medium that records (stores) a program that can be installed in a computer and executed by the computer is implemented by the removable medium 231, as illustrated in FIG. 15, which is a packaged medium including a magnetic disk (including a flexible disk), an optical disk (including a compact-disc read-only memory (CD-ROM) and a digital versatile disc (DVD)), a magneto-optical disk (including a mini-disc (MD)), or a semiconductor memory, the ROM 222 temporarily or permanently storing a program, or a hard disk included in the storage unit 228. A program is recorded in the recording medium using, as occasion calls, a wired or wireless communication medium, such as a local area network, the Internet, or digital satellite broadcasting, via the communication unit 229 which is an interface such as a router or a modem.

In the present specification, steps describing the above-described series of processes include processes that are performed time sequentially in accordance with the order described in the specification, and processes that are not necessarily performed time sequentially but are executed in parallel or individually.

In the present specification, the system represents the entire apparatus including a plurality of devices.

An embodiment of the present invention is not limited to the above-described embodiment, and various modifications can be made without departing from the gist of the present invention.

The present application contains subject matter related to that disclosed in Japanese Priority Patent Application JP 2009-247759 filed in the Japan Patent Office on Oct. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   holding means for holding, in advance, review sentences for a book;
   detection means for detecting, in a captured image obtained by capturing an image of a person, the person;
   review sentence obtaining means for obtaining, by performing a morphological analysis on the review sentences, affirmative review sentences recommending purchasing the book;
   reading means for reading at least one personalized review sentence of the affirmative review sentences which is associated with a detection result of the person from among the review sentences held in advance; and
   output means for outputting the at least one personalized review sentence, while visually emphasizing a part of the at least one personalized review sentence, based upon the detection result.

2. The information processing apparatus according to claim 1,
   wherein the holding means holds, for each person, the review sentences determined in advance in accordance with an attribute of the person, in association with each other, and
   wherein the reading means reads, in response to detection of the person, the at least one personalized review sentence associated with the detected person from among the review sentences held in advance.

3. The information processing apparatus according to claim 2,
   wherein the at least one personalized review sentence is a review sentence of the book to be recommended to the person, and
   wherein the output means outputs the at least one personalized review sentence to a display unit and causes the at least one personalized review sentence to be displayed.

4. The information processing apparatus according to claim 3, wherein the output means emphasizes a certain word among words constituting the at least one personalized review sentence and causes the at least one personalized review sentence including the emphasized certain word to be displayed.

5. The information processing apparatus according to claim 4, wherein the review sentence obtaining means includes:
   calculation means for calculating, for each of a plurality of candidate review sentences representing candidates for the affirmative review sentences, an appropriateness score representing the degree of how the candidate review sentence is appropriate as an affirmative review sentence; and
   extraction means for extracting, from among the plurality of candidate review sentences, at least one affirmative review sentence whose appropriateness score is greater than or equal to a certain appropriateness threshold,
   wherein the holding means holds the extracted affirmative review sentence as display data.

6. The information processing apparatus according to claim 5, the review sentence obtaining means further comprising computing means for computing a word score for each of words constituting each of the plurality of candidate review sentences,
   wherein the calculation means calculates, as the appropriateness score, an average of word scores computed for each of the plurality of candidate review sentences.

7. The information processing apparatus according to claim 6, wherein the output means emphasizes, among words constituting the at least one personalized review sentence, a word whose word score is greater than or equal to a certain score threshold and causes the at least one personalized review sentence including the emphasized word to be displayed.

8. The information processing apparatus according to claim 6, wherein the computing means computes the word score of a word based on the degree of frequency of the word appearing in the plurality of candidate review sentences.

9. The information processing apparatus according to claim 2,
   wherein the holding means further holds, for each of combinations of a plurality of persons, review sentences determined in advance in accordance with attributes of the plurality of persons, in association with each other, and
   wherein the reading means reads, in response to detection of a plurality of persons s, at least one personalized review sentence associated with a combination of the detected plurality of persons.

10. The information processing apparatus according to claim 3, further comprising determination means for determining whether the person detected is gazing at the display unit for a certain time or longer,
    wherein the output means causes a review sentence that is more detailed than the at least one personalized review sentence being displayed on the display unit to be displayed, when the determination means determines that the person is gazing at the display unit for the certain time or longer.

11. The information processing apparatus according to claim 2, wherein the attribute of the person includes at least one of the age, race, facial expression, and sex of the person.

12. The information processing apparatus according to claim 1,
    wherein the holding means holds, for each of articles to be recommended to the person, presentation data determined in advance in accordance with the article, and wherein the reading means reads, in response to detection of an article, presentation data associated with the detected article from among items of presentation data held in advance.

13. The information processing apparatus according to claim 12,
wherein the presentation data is detailed data representing details of an article, and
wherein the output means outputs the detailed data to the display unit and causes the detailed data to be displayed.

14. The information processing apparatus according to claim 13, further comprising second holding means for holding, for each of the articles, related detailed data representing details of a related article that is related to the article,
wherein the reading means further reads, in response to detection of the article, related detailed data associated with the article from among items of related detailed data held in advance, and
wherein the output means outputs the detailed data and the related detailed data to the display unit and causes the detailed data and the related detailed data to be displayed.

15. The information processing apparatus according to claim 1, wherein the reading means reads, in response to detection of the person, presentation data based on a purchase history representing a history of the person purchasing articles.

16. The information processing apparatus according to claim 1, wherein the part of the at least one personalized review sentence is less than a whole of the at least one personalized review sentence.

17. The information processing apparatus according to claim 1, wherein visually emphasizing includes outputting the part of the at least one personalized review sentence in a form different relative to a form of a remainder of the output at least one personalized review sentence.

18. An information processing method for an information processing apparatus including holding means, detection means, review sentence obtaining means, reading means, and outputting means, the method comprising the steps of:
holding, by the holding means, in advance, review sentences for a book;
detecting, by the detection means, in a captured image obtained by capturing an image of a person, the person;
obtaining, by the review sentence obtaining means, affirmative review sentences recommending purchasing the book by performing a morphological analysis on the review sentences;
reading, by the reading means, at least one personalized review sentence of the affirmative review sentences which is associated with a detection result of the person from among the review sentences held in advance; and
outputting, by the output means, the at least one personalized review sentence, while visually emphasizing a part of the at least one personalized review sentence, based upon the detection result.

19. A non-transitory computer readable medium storing a program for causing a computer to function as:
holding means for holding, in advance, review sentences for a book;
detection means for detecting, in a captured image obtained by capturing an image of a person, the person;
review sentence obtaining means for obtaining, by performing a morphological analysis on the review sentences, affirmative review sentences recommending purchasing the book;
reading means for reading at least one personalized review sentence of the affirmative review sentences which is associated with a detection result of the person from among the review sentences held in advance; and
output means for outputting the at least one personalized review sentence, while visually emphasizing a part of the at least one personalized review sentence, based upon the detection result.

20. An information processing apparatus comprising:
a holding unit configured to hold, in advance, review sentences for a book;
a detection unit configured to detect, in a captured image obtained by capturing an image of a person, the person;
a review sentence obtaining unit configured to obtain, by performing a morphological analysis on the review sentences, affirmative review sentences recommending purchasing the book;
a reading unit configured to read at least one personalized review sentence of the affirmative review sentences which is associated with a detection result of the person from among the review sentences held in advance; and
an output unit configured to output the at least one personalized review sentence, while visually emphasizing a part of the at least one personalized review sentence, based upon the detection result.

* * * * *